(12) United States Patent
Lakshmi Narayanan et al.

(10) Patent No.: US 11,610,125 B2
(45) Date of Patent: Mar. 21, 2023

(54) SENSOR FUSION

(71) Applicant: Honda Motor Co., Ltd., Tokyo (JP)

(72) Inventors: Athmanarayanan Lakshmi Narayanan, Sunnyvale, CA (US); Avinash Siravuru, Pittsburgh, PA (US)

(73) Assignee: HONDA MOTOR CO., LTD., Tokyo (JP)

( * ) Notice: Subject to any disclaimer, the term of this patent is extended or adjusted under 35 U.S.C. 154(b) by 593 days.

(21) Appl. No.: 16/694,419

(22) Filed: Nov. 25, 2019

(65) Prior Publication Data

US 2021/0004687 A1 Jan. 7, 2021

Related U.S. Application Data

(63) Continuation-in-part of application No. 16/664,356, filed on Oct. 25, 2019.

(60) Provisional application No. 62/870,460, filed on Jul. 3, 2019.

(51) Int. Cl.
| | | |
|---|---|---|
| *G06N 3/08* | (2006.01) | |
| *G06N 3/082* | (2023.01) | |
| *G06N 3/084* | (2023.01) | |

(52) U.S. Cl.
CPC ............ *G06N 3/082* (2013.01); *G06N 3/084* (2013.01)

(58) Field of Classification Search
CPC .......... G06N 3/082; G06N 3/084; G06N 3/08; G06N 3/0481; G06N 3/0445
See application file for complete search history.

(56) References Cited

U.S. PATENT DOCUMENTS

| | | |
|---|---|---|
| 10,558,750 B2 | 2/2020 | Lu et al. |
| 10,839,156 B1 | 11/2020 | Saxena et al. |
| 11,074,318 B2 | 7/2021 | Ma et al. |
| 11,106,975 B2 | 8/2021 | Lei |
| 11,210,565 B2 | 12/2021 | Li et al. |
| 2019/0087710 A1 | 3/2019 | Guo et al. |
| 2020/0142421 A1* | 5/2020 | Palanisamy .......... G06N 3/0454 |
| 2021/0004664 A1 | 1/2021 | Lakshmi Narayanan |

OTHER PUBLICATIONS

S. Bai, J. Z. Kolter, and V. Koltun, "An empirical evaluation of generic convolutional and recurrent networks for sequence modeling," arXiv preprint arXiv:1803.01271, 2018.

Berkeley Multimodal Human Action Database (MHAD) https://tele-immersion.citris-uc.org/berkeley_mhad.

(Continued)

*Primary Examiner* — Jamal Javaid
(74) *Attorney, Agent, or Firm* — Rankin, Hill & Clark LLP

(57) ABSTRACT

According to one aspect, a method for sensor fusion associated with a long short-term memory (LSTM) cell may include generating a first adjusted sensor encoding based on a first sensor encoding from a first sensor, generating a second adjusted sensor encoding based on a second sensor encoding from a second sensor, generating a fusion result based on the first adjusted sensor encoding and the second adjusted sensor encoding, generating a first product based on the fusion result and the first adjusted sensor encoding, generating a second product based on the second adjusted sensor encoding, and generating a fused state based on the first product and the second product.

20 Claims, 12 Drawing Sheets

(56) References Cited

OTHER PUBLICATIONS

M. Bojarski, D. Del Testa, D. Dworakowski, B. Firner, B. Flepp, P. Goyal, L. D. Jackel, M. Monfort, U. Muller, J. Zhang et al., "End to end learning for self-driving cars," arXiv preprint arXiv:1604.07316, 2016.

Braun et al., "Sensor Transformation Attention Networks" OpenReview.net, ICLR 2018 Conference Blind Submission, Feb. 15, 2018. https://openreview.net/forum?id=Bk346Ok0W.

Burgard, et al., "Perspectives on Deep Multimodel Robot Learning" https://pdfs.semanticscholar.org/e151/c99b5e55bfc03047a2c6c2118cd9e4ad829b.pdf.

R. Calandra, A. Owens, M. Upadhyaya, W. Yuan, J. Lin, E. H. Adelson, and S. Levine, "The feeling of success: Does touch sensing help predict grasp outcomes?" arXiv preprint arXiv:1710.05512, 2017.

Casas et al., "IntentNet: Learning to Predict Intention from Raw Sensor Data", Uber Advanced Technologies Group, University of Toronto, 2nd Conference on Robot Learning (CoRL 2018), Zürich, Switzerland. http://proceedings.mlr.press/v87/casas18a/casas18a.pdf.

M.-F. Chang, J. Lambert, P. Sangkloy, J. Singh, S. Bak, A. Hartnett, D. Wang, P. Carr, S. Lucey, D. Ramanan, and J. Hays, "Argoverse: 3d tracking and forecasting with rich maps," in The IEEE Conference on Computer Vision and Pattern Recognition (CVPR), Jun. 2019.

Chao et al., "Long Short Term Memory Recurrent Neural Network based Multimodal Dimensional Emotion Recognition", AVEC'15, Oct. 26, 2015, Brisabne, Australia. https://www.researchgate.net/profile/Ya_Li2/publication/301422418_Long_Short_Term_Memory_Recurrent_Neural_Network_based_Multimodal_Dimensional_Emotion_Recognition/links/57a970dd08aed76703f88fe4/Long-Short-Term-Memory-Recurrent-Neural-Network-based-Multimodal-Dimensional-Emotion-Recognition.pdf.

C. Chen, A. Seff, A. Kornhauser, and J. Xiao, "Deepdriving: Learning affordance for direct perception in autonomous driving," in Proceed-ings of the IEEE International Conference on Computer Vision, 2015, pp. 2722-2730.

Y. Chen, J. Wang, J. Li, C. Lu, Z. Luo, H. Xue, and C. Wang, "Lidar-video driving dataset: Learning driving policies effectively," in Proceedings of the IEEE Conference on Computer Vision and Pattern Recognition, 2018, pp. 5870-5878.

K. Cho, B. Van Merriënboer, C. Gulcehre, D. Bahdanau, F. Bougares, H. Schwenk, and Y. Bengio, "Learning phrase representations using rnn encoder-decoder for statistical machine translation," arXiv preprint arXiv:1406.1078, 2014.

J. Chung, C. Gulcehre, K. Cho, and Y. Bengio, "Empirical evaluation of gated recurrent neural networks on sequence modeling," arXiv preprint arXiv:1412.3555, 2014.

J. Deng, W. Dong, R. Socher, L.-J. Li, K. Li, and L. Fei-Fei, "Imagenet: A large-scale hierarchical image database," in 2009 IEEE conference on computer vision and pattern recognition. Ieee, 2009, pp. 248-255.

A. Dosovitskiy, G. Ros, F. Codevilla, A. Lopez, and V. Koltun, "Carla: An open urban driving simulator," arXiv preprint arXiv:1711.03938, 2017.

Feichtenhofer et al., "Convolutional Two-Stream Network Fusion for Video Action Recognition", Computer Vision Foundation. https://www.cv-foundation.org/openaccess/content_cvpr_2016/papers/Feichtenhofer_Convolutional_Two-Stream_Network_CVPR_2016_paper.pdf.

Feng et al., "Deep Multi-modal Object Detection and Semantic Segmentation for Autonomous Driving: Datasets, Methods, and Challenges" https://arxiv.org/pdf/1902.07830.pdf.

A. Geiger, P. Lenz, C. Stiller, and R. Urtasun, "Vision meets robotics: The kitti dataset," The International Journal of Robotics Research, vol. 32, No. 11, pp. 1231-1237, 2013.

F. A. Gers, J. Schmidhuber, and F. Cummins, "Learning to forget: Continual prediction with lstm," 1999.

R. Girdhar, D. Ramanan, A. Gupta, J. Sivic, and B. Russell, "Action-vlad: Learning spatio-temporal aggregation for action classification," in Proceedings of the IEEE Conference on Computer Vision and Pattern Recognition, 2017, pp. 971-980.

K. Greff, R. K. Srivastava, J. Koutnik, B. R. Steunebrink, and J. Schmidhuber, "Lstm: A search space odyssey," IEEE transactions on neural networks and learning systems, vol. 28, No. 10, pp. 2222-2232, 2016.

S. Hochreiter and J. Schmidhuber, "Long short-term memory," Neural computation, vol. 9, No. 8, pp. 1735-1780, 1997.

Hori et al., "Attention-Based Multimodal Fusion for Video Description", Computer Vision Foundation. http://openaccess.thecvf.com/content_ICCV_2017/papers/Hori_Attention-Based_Multimodal_Fusion_ICCV_2017_paper.pdf.

D. Hu, X. Li, and X. Lu, "Temporal multimodal learning in audiovisual speech recognition," in 2016 IEEE Conference on Computer Vision and Pattern Recognition (CVPR). IEEE, 2016, pp. 3574-3582.

A. Jain, A. Singh, H. S. Koppula, S. Soh, and A. Saxena, "Recurrent neural networks for driver activity anticipation via sensory-fusion architecture," in 2016 IEEE International Conference on Robotics and Automation (ICRA). IEEE, 2016, pp. 3118-3125.

Jakobovski, Free Spoken Digit Database MNIST. https://github.com/Jakobovski/free-spoken-digit-dataset.

M. Johnson-Roberson, C. Barto, R. Mehta, S. N. Sridhar, K. Rosaen, and R. Vasudevan, "Driving in the matrix: Can virtual worlds replace human-generated annotations for real world tasks?" arXiv preprint arXiv:1610.01983, 2016.

R. Jozefowicz, W. Zaremba, and I. Sutskever, "An empirical exploration of recurrent network architectures," in International Conference on Machine Learning, 2015, pp. 2342-2350.

A. Kendall, J. Hawke, D. Janz, P. Mazur, D. Reda, J.-M. Allen, V.-D. Lam, A. Bewley, and A. Shah, "Learning to drive in a day," in 2019 International Conference on Robotics and Automation (ICRA). IEEE, 2019, pp. 8248-8254.

D. P. Kingma and J. Ba, "Adam: A method for stochastic optimization," arXiv preprint arXiv:1412.6980, 2014.

Li et al., "Connecting Touch and Vision via Cross-Modal Prediction", CVPR 2019 http://visgel.csail.mit.edu/#Demo.

Z. Li, Y. Gan, X. Liang, Y. Yu, H. Cheng, and L. Lin, "Lstm-cf: Unifying context modeling and fusion with lstms for rgb-d scene labeling," in European conference on computer vision. Springer, 2016, pp. 541-557.

G.-H. Liu, A. Siravuru, S. Prabhakar, M. Veloso, and G. Kantor, "Learning end-to-end multimodal sensor policies for autonomous navigation," in Conference on Robot Learning, 2017, pp. 249-261.

W. Luo, B. Yang, and R. Urtasun, "Fast and furious: Real time end-to-end 3d detection, tracking and motion forecasting with a single convolutional net," in Proceedings of the IEEE Conference on Computer Vision and Pattern Recognition, 2018, pp. 3569-3577.

U. Muller, J. Ben, E. Cosatto, B. Flepp, and Y. L. Cun, "Off-road obstacle avoidance through end-to-end learning," in Advances in neural information processing systems, 2006, pp. 739-746.

K. Nakamura, S. Yeung, A. Alahi, and L. Fei-Fei, "Jointly Learning Energy Expenditures and Activities using Egocentric Multimodal Signals," in CVPR, 2017.

Ordóñez et al. "Deep Convolutional and LSTM Recurrent Neural Networks for Multimodal Wearable Activity Recognition". Sensors 2016, 16(1), 115. https://www.mdpi.com/1424-8220/16/1/115/htm.

C. Szegedy, S. Ioffe, V. Vanhoucke, and A. A. Alemi, "Inception-v4, inception-resnet and the impact of residual connections on learning," in Thirty-First AAAI Conference on Artificial Intelligence, 2017.

D. A. Pomerleau, "Alvinn: An autonomous land vehicle in a neural network," in Advances in neural information processing systems, 1989, pp. 305-313.

N. Radwan, A. Valada, and W. Burgard, "Multimodal interaction-aware motion prediction for autonomous street crossing," arXiv preprint arXiv:1808.06887, 2018.

N. Radwan, A. Valada, and W. Burgard, "Vlocnet++: Deep multitask learning for semantic visual localization and odometry," IEEE Robotics and Automation Letters, vol. 3, No. 4, pp. 4407-4414, 2018.

(56) References Cited

OTHER PUBLICATIONS

S. S. Rajagopalan, L.-P. Morency, T. Baltrusaitis, and R. Goecke, "Extending long short-term memory for multi-view structured learning," in European Conference on Computer Vision. Springer, 2016, pp. 338-353.
V. Ramanishka, Y.-T. Chen, T. Misu, and K. Saenko, "Toward driving scene understanding: A dataset for learning driver behavior and causal reasoning," in Proceedings of the IEEE Conference on Computer Vision and Pattern Recognition, 2018, pp. 7699-7707.
R. H. Rasshofer, M. Spies, and H. Spies, "Influences of weather phenomena on automotive laser radar systems," Advances in Radio Science, vol. 9, No. B. 2, pp. 49-60, 2011.
J. Ren, Y. Hu, Y.-W. Tai, C. Wang, L. Xu, W. Sun, and Q. Yan, "Look, listen and learna multimodal lstm for speaker identification," in Thirtieth AAAI Conference on Artificial Intelligence, 2016.
Roy et al., "TVD: a reproducible and multiply aligned TV series dataset". http://tvd.niderb.fr/.
R. R. Selvaraju, M. Cogswell, A. Das, R. Vedantam, D. Parikh, and D. Batra, "Grad-cam: Visual explanations from deep networks via gradient-based localization," in Proceedings of the IEEE International Conference on Computer Vision, 2017, pp. 618-626.
Z. Shou, J. Pan, J. Chan, K. Miyazawa, H. Mansour, A. Vetro, X. Giro-i Nieto, and S.-F. Chang, "Online Action Detection in Untrimmed, Streaming Videos—Modeling and Evaluation," arXiv:1802.06822, 2018.
Srivastava et al., "Unsupervised Learning of Video Representations using LSTMs" Proceedings of the 32nd International Conference on Machine Learning, Lille, France, 2015. http://www.cs.toronto.edu/~nitish/unsupervised_video/.
Taamneh et al., "A multimodal dataset for various forms of distracted driving", Scientific Data, 4:170110, Aug. 15, 2017.
A. Valada, R. Mohan, and W. Burgard, "Self-supervised model adaptation for multimodal semantic segmentation," arXiv preprint arXiv:1808.03833, 2018.
Vielzeuf et al., "Temporal Multimodal Fusion for Video Emotion Classification in the Wild". https://arxiv.org/pdf/1709.07200.pdf.
B. Wymann, E. Espié, C. Guionneau, C. Dimitrakakis, R. Coulom, and Sumner, "Tores, the open racing car simulator," Software available at http://torcs. sourceforge. net, 2000.
H. Xu, Y. Gao, F. Yu, and T. Darrell, "End-to-end learning of driving models from large-scale video datasets," in Proceedings of the IEEE conference on computer vision and pattern recognition, 2017, pp. 2174-2182.
X. Yang, P. Ramesh, R. Chitta, S. Madhvanath, E. A. Bernal, and J. Luo, "Deep multimodal representation learning from temporal data," in Proceedings of the IEEE Conference on Computer Vision and Pattern Recognition, 2017, pp. 5447-5455.
B. Zhou, A. Khosla, A. Lapedriza, A. Oliva, and A. Torralba, "Learning deep features for discriminative localization," in Proceedings of the IEEE Conference on Computer Vision and Pattern Recognition, 2016, pp. 2921-2929.
Udacity, "Udacity's self-driving car simulator," https://github.com/udacity/self-driving-car-sim, 2017.
N. Yoshida, "Gym-torcs," https://github.com/ugo-nama-kun/gym tores, 2016.
C. Gu, C. Sun, D. Ross, C. Vondrick, C. Pantofaru, Y. Li, S. Vijayanarasimhan, G. Toderici, S. Ricco, R. Sukthankar, C. Schmid, and J. Malik, "AVA: A Video Dataset of Spatio-temporally Localized Atomic Visual Actions," Google Research, Inria, Laboratoire Jean Kuntzmann, Grenoble, France, University of California at Berkeley, USA, pp. 6047-6056 http://research.google.com/ava/download.html#ava_speech_download.
Office Action of U.S. Appl. No. 16/664,356 dated Jul. 15, 2022, 21 pages.
Notice of Allowance of U.S. Appl. No. 16/664,356 dated Oct. 18, 2022, 12 pages.

\* cited by examiner

SENSOR FUSION

CROSS-REFERENCE TO RELATED APPLICATIONS

This application is a continuation-in-part (CIP) of U.S. Non-Provisional patent application Ser. No. 16/664,356 entitled SENSOR FUSION, filed on Oct. 25, 2019, which claims the benefit of U.S. Provisional Patent Application, Ser. No. 62/870,460 entitled "SENSOR FUSION", filed on Jul. 3, 2019; the entirety of the above-noted applications is incorporated by reference herein.

BACKGROUND

A long short-term memory (LSTM) is an artificial recurrent neural network (RNN) architecture for deep learning or machine learning. An LSTM cell remembers values over arbitrary time intervals and regulates the flow of information into and out of the LSTM cell. During back propagation, recurrent neural networks may suffer from a vanishing gradient problem. Gradients are values used to update a neural networks weights. The vanishing gradient problem occurs when the gradient shrinks as it back propagates through time. If a gradient value becomes extremely small, the gradient may not contribute to the learning.

BRIEF DESCRIPTION

According to one aspect, a long short-term memory (LSTM) cell for sensor fusion may include a first forget gate, a second forget gate, a first input gate, a second input gate, a first output gate, a second output gate, a hidden state gate, and a cell state gate. The first forget gate may receive a first sensor encoding $s_t^i$ and a first shared hidden state $h_{t-1}$. The second forget gate may receive a second sensor encoding $s_t^j$ and the first shared hidden state $h_{t-1}$. The first input gate may receive the first sensor encoding $s_t^i$ and the first shared hidden state $h_{t-1}$. The second input gate may receive second sensor encoding $s_t^j$ and the first shared hidden state $h_{t-1}$. The first output gate may generate a first output based on a first shared cell state $c_{t-1}$, the first sensor encoding $s_t^i$, and the first shared hidden state $h_{t-1}$. The second output gate may generate a second output based on the first shared cell state $c_{t-1}$, the second sensor encoding $s_t^j$, and the first hidden state $h_{t-1}$. The hidden state gate may generate a second shared hidden state $h_t$ based on the first output and the second output. The cell state gate may generate a second shared cell state $c_t$ based on an output of the first forget gate, an output of the second forget gate, an output of the first input gate, and an output of the second input gate.

The first forget gate or the second forget gate may employ a sigmoid function to generate the output of the first forget gate or the output of the second forget gate, respectively. The output of the first forget gate $f_t^i = \sigma(W_f^i * s_t^i + U_f^i * h_{t-1} + b_f^i)$. The first input gate or the second input gate may employ a sigmoid function, a hyperbolic tangent function (tanh), or an element-wise product function to generate the output of the first input gate or the output of the second input gate, respectively. The output of the first input gate $i_g^i = \sigma(W_t^i * s_t^i + U_i^i * h_{t-1} + b_i^i)$. The first output gate or the second output gate may employ a sigmoid function, a hyperbolic tangent function (tanh), or an element-wise product function to generate an output of the first output gate or an output of the second output gate, respectively. The output of the first output gate $o_t^i = \sigma(W_o^i * s_t^i + h_{t-1} + b_o^i)$. The hidden state gate may generate the second shared hidden state $h_t$ by calculating an element-wise sum of the first output and the second output.

A first architecture within the LSTM cell may include the first forget gate, the first input gate, and the first output gate. A second architecture within the LSTM cell may include the second forget gate, the second input gate, and the second output gate. The first architecture may be implemented in parallel to the second architecture. The first architecture may generate a first partial shared cell state $c_t^i = c_{t-1} \odot f_t^i + i_t^i \odot g_t^i$. The second architecture may generate a second partial shared cell state $c_t^j = c_{t-1} \odot f_t^j + i_t^j \odot g_t^j$. The cell state gate may generate the second shared cell state $c_t$ by calculating an element-wise sum of the first partial shared cell state $c_t^i$ and the second partial shared cell state $c_t^i$.

According to one aspect, a method for sensor fusion associated with a long short-term memory (LSTM) neural network may include receiving a first sensor encoding $s_t^i$ and a first shared hidden state $h_{t-1}$ at a first forget gate, receiving a second sensor encoding $s_t^j$ and the first shared hidden state $h_{t-1}$ at a second forget gate, receiving the first sensor encoding $s_t^i$ and the first shared hidden state $h_{t-1}$ at a first input gate, receiving second sensor encoding $s_t^j$ and the first shared hidden state $h_{t-1}$ at a second input gate, generating a first output based on a first shared cell state $c_{t-1}$, the first sensor encoding 4, and the first shared hidden state $h_{t-1}$ at a first output gate, generating a second output based on the first shared cell state $c_{t-1}$, the second sensor encoding $s_t^j$, and the first hidden state $h_{t-1}$ at a second output gate, generating a second shared hidden state $h_t$ based on the first output and the second output at a hidden state gate, and generating a second shared cell state $c_t$ based on an output of the first forget gate, an output of the second forget gate, an output of the first input gate, and an output of the second input gate at a cell state gate.

The method for sensor fusion may include generating the output of the first forget gate or the output of the second forget gate by employing a sigmoid function. The method for sensor fusion may include generating the output of the first input gate or the output of the second input gate by employing a sigmoid function, a hyperbolic tangent function (tanh), or an element-wise product function. The method for sensor fusion may include generating an output of the first output gate or an output of the second output gate by employing a sigmoid function, a hyperbolic tangent function (tanh), or an element-wise product function.

According to one aspect, a long short-term memory (LSTM) cell for sensor fusion may include M number of forget gates, M number of input gates, and M number output gates. The M number of forget gates may receive M sets of sensor encoding data from M number of sensors and a shared hidden state $h_{t-1}$. The M number of input gates may receive the corresponding M sets of sensor data and the shared hidden state $h_{t-1}$. The M number output gates may generate M partial shared cell state outputs and M partial shared hidden state outputs based on the M sets of sensor encoding data, the shared hidden state $h_{t-1}$, and a shared cell state $c_{t-1}$. M may be $>=2$.

The LSTM cell for sensor fusion may include a cell state gate generating an updated shared cell state $c_t$ by calculating an element-wise sum of the M partial shared cell state outputs. The LSTM cell for sensor fusion may include a hidden state gate generating an updated shared hidden state $h_t$ by calculating an element-wise sum of the M partial shared hidden state outputs. The LSTM cell for sensor fusion may include a first architecture and a second architecture. The first architecture within the LSTM cell may include a first forget gate of the M number of forget gates, a first input gate of the M number of input gates, and a first output gate of the M number of output gates. The second architecture within the LSTM cell may include a second forget gate of the M number of forget gates, a second input gate of the M number of input gates, and a second output gate of the M number of output gates. The first architecture may be implemented in parallel to the second architecture. The M number of forget gates, the M number of input gates, and the M number of output gates may employ a sigmoid function.

According to one aspect, a fusion cell associated with a long short-term memory (LSTM) cell may include a first rectifier, a second rectifier, a fusion gate, a first element-wise product gate, a second element-wise product gate, and an output gate. The first rectifier may receive a first sensor encoding $s_t^i$ from a first sensor and generate a first adjusted sensor encoding $e_t^i$. The second rectifier may receive a second sensor encoding $s_t^j$ from a second sensor and generate a second adjusted sensor encoding $e_t^j$. The fusion gate may receive the first adjusted sensor encoding $e_t^i$ and the second adjusted sensor encoding $e_t^j$ and generate a fusion gate result $p_t^k$. The first element-wise product gate may receive the fusion gate result $p_t^k$ and the first adjusted sensor encoding $e_t^i$ and generate a first product. The second element-wise product gate may receive $(1-p_t^k)$ and the second adjusted sensor encoding $e_t^j$ and generate a second product. The output gate may receive the first product and the second product and generate a fused state $a_t$.

The first rectifier or the second rectifier may be a rectified linear unit (ReLU). The fusion gate may employ an element-wise sum function and a sigmoid function to generate the fusion gate result $p_t^k$ based on the first adjusted sensor encoding $e_t^i$ and the second adjusted sensor encoding $e_t^j$. The first element-wise product gate or the second element-wise product gate may employ an element-wise product function to generate the first product or the second product, respectively. The output gate may employ an element-wise sum function to generate the fused state $a_t$ based on the first product and the second product. The first adjusted sensor encoding $e_t^i=\text{relu}(W_e^i * s_t^i)$. The fusion gate result $p_t^k=\sigma(\Sigma_{i=1}^M W_p^i * e_t^i)$, $\forall k \in [1, m-1]$. The fused state $a_t=(\Sigma_{k=1}^{M-1} p_t^k \odot e_t^k)+(1-\Sigma_{k=1}^{M-1} p_t^k)\odot e_t^k$. The fused state $a_t$ may be input to a first gate of the LSTM cell which employs an element-wise sum function summing the fused state $a_t$ and a hidden state $h_{t-1}$. An output of the first gate of the LSTM cell may be passed as an input to a forget gate of the LSTM cell.

According to one aspect, a fusion cell associated with a long short-term memory (LSTM) cell may include a first rectifier, a second rectifier, a fusion gate, a first element-wise product gate, and a second element-wise product gate. The first rectifier may receive a first sensor encoding $s_t^i$ from a first sensor and generate a first adjusted sensor encoding $e_t^i$. The second rectifier may receive a second sensor encoding $s_t^j$ from a second sensor and generate a second adjusted sensor encoding $e_t^j$. The fusion gate may receive the first adjusted sensor encoding $e_t^i$ and the second adjusted sensor encoding $e_t^j$ and generate a fusion gate result $p_t^k$. The first element-wise product gate may receive the fusion gate result $p_t^k$ and the first adjusted sensor encoding $e_t^i$ and generate a first product. The second element-wise product gate may receive $(1-p_t^k)$ and the second adjusted sensor encoding $e_t^j$ and generate a second product.

The first adjusted sensor encoding $e_t^i=\text{relu}(W_e^i * s_t^i)$. The fusion gate result $p_t^k=\sigma(\Sigma_{i=1}^M W_p^i * e_t^i)$, $\forall k \in [1, M-1]$. The fusion gate may employ an element-wise sum function and a sigmoid function to generate the fusion gate result $p_t^k$ based on the first adjusted sensor encoding $e_t^i$ and the second adjusted sensor encoding $e_t^j$. The first product may be input to a first gate of a first architecture within the LSTM cell which employs an element-wise sum function summing the first product and a hidden state $h_{t-1}$. The second product may be input to a first gate of a second architecture within the LSTM cell which employs an element-wise sum function summing the second product and a hidden state $h_{t-1}$.

According to one aspect, a method for sensor fusion associated with a long short-term memory (LSTM) cell may include generating a first adjusted sensor encoding $e_t^i$ based on a first sensor encoding $s_t^i$ from a first sensor, generating a second adjusted sensor encoding $e_t^j$ based on a second sensor encoding $s_t^j$ from a second sensor, generating a fusion result $p_t^k$ based on the first adjusted sensor encoding $e_t^i$ and the second adjusted sensor encoding $e_t^j$, generating a first product based on the fusion result $p_t^k$ and the first adjusted sensor encoding $e_t^i$, generating a second product based on $(1-p_t^k)$ and the second adjusted sensor encoding $e_t^j$, and generating a fused state $a_t$ based on the first product and the second product.

The first adjusted sensor encoding $e_t^i=\text{relu}(W_e^i * s_t^i)$. The fusion result $p_t^k=\sigma(\Sigma_{i=1}^M W_p^i * e_t^i)$, $\forall k \in [1, m-1]$. The fused state $a_t=(\Sigma_{k=1}^{M-1} p_t^k \odot e_t^k)+(1-\Sigma_{k=1}^{M-1} p_t^k)\odot e_t^k$.

DETAILED DESCRIPTION

Figure 1:
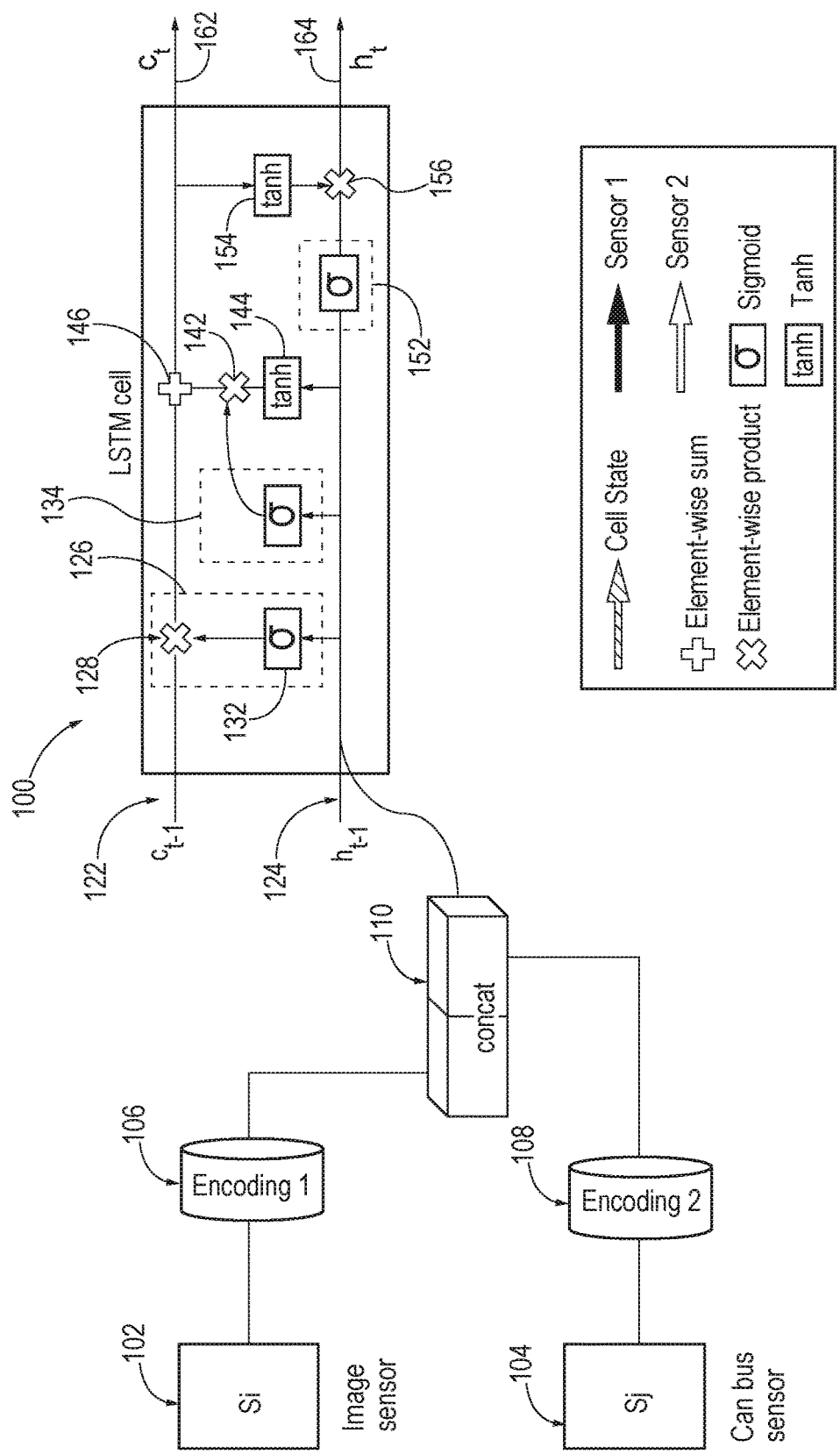
FIG. 1 is an illustration of an exemplary long short-term memory (LSTM) cell, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "cell", as used herein, may be implemented as a hardware circuit, integrated circuit (IC), etc. or implemented by the processor using digital signals, data signals, computer instructions, processor instructions, etc.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

Early Recurrent Fusion (ERF)

FIG. 1 is an illustration of an exemplary long short-term memory (LSTM) cell 100, according to one aspect. The LSTM cell of FIG. 1 may include one or more gates and may receive input signals (e.g., a first sensor encoding $s_t^i$, a second sensor encoding $s_t^j$) from two or more sensors (e.g., $S^i$ 102, $S^j$ 104). According to one aspect, the two or more sensors $S^i$ 102, $S^j$ 104 may be of different sensor types (e.g., $S^i$ 102 may be an image sensor, $S^j$ 104 may be a controller area network bus sensor). Although FIG. 1 and some of the other figures described herein are described with reference to an image sensor and a CAN bus sensor, any other sensor types may be utilized. The two or more sensors $S^i$ 102 (e.g., a first sensor), $S^j$ 104 (e.g., a second sensor) may be of the same sensor type (i.e., both may be image sensors, etc.) or may be of different sensor types (e.g., image sensors, joint encoders, inertial measurement unit (IMU) data, graphics processing unit (GPU) data, audio sensors, touch sensors, tactile sensors, etc.).

A first encoding module 106 and a second encoding module 108
may be configured to pre-process the sensor input signals or the first sensor encoding $s_t^i$ and the second sensor encoding $s_t^j$ and bring the respective encodings $s_t^i$, $s_t^j$ to the same dimension prior to any sensor fusion. In this way, the first encoding module 106 and the second encoding module 108 process the first sensor encoding $s_t^i$ and the second sensor encoding $s_t^j$, respectively, such that they are temporally correlated.

According to one aspect, Early Recurrent Fusion (ERF) may be implemented via concatenation or fusion via a concatenator 110, which may concatenate, fuse, perform fusion, sum, etc. the respective encodings $s_t^i$, $s_t^j$. The output or result of the concatenator 110, a first cell state $c_{t-1}$ 122 (e.g., which may be a shared cell state across two or more architectures, which are discussed herein with respect to FIGS. 3 and 5A-5B), and a first hidden state $h_{t-1}$ 124 (e.g., which may be a shared hidden state across the two or more architectures, which are discussed herein with respect to FIGS. 3 and 5A-5B) may be inputs to the LSTM cell 100 of FIG. 1.

FIG. 1 is an illustration of an exemplary first architecture of the LSTM cell 100, and according to one aspect, may be implemented in parallel with one or more additional architectures. The first architecture of the LSTM cell 100 of FIG. 1 may include a first forget gate 126 receiving the output or the result of the concatenator 110 (concatenation result of the first sensor encoding $s_t^i$ 102 and the second sensor encoding $s_t^j$ 104) and the first hidden state $h_{t-1}$ 124. The first forget gate 126 may include or employ a sigmoid function 132 and an element-wise product function 128 to generate an output for the first forget gate 126, which may be an intermediary result associated with a second cell state $c_t$ 162.

Additionally, the first architecture of the LSTM cell 100 of FIG. 1 may include a first input gate 134 receiving the output or the result of the concatenator 110 and the first hidden state $h_{t-1}$ 124. The first input gate 134 may include or employ a sigmoid function (e.g., 134), an element-wise product function 142, a hyperbolic tangent function (tanh) 144, or an element-wise sum function 146 to generate an output of the first input gate 134. The tanh function 144 may receive the output or the result of the concatenator 110 and the first hidden state $h_{t-1}$ 124, the element-wise product function 142 may be taken of an output of the tanh function 144 and an output of the sigmoid function 134. An output of the element-wise product function 142 may be element-wise summed 146 with an output of the first forget gate 126 to thereby generate the second cell state $c_t$ 162.

The first architecture of the LSTM cell 100 of FIG. 1 may include an output gate 152, which may include or employ a sigmoid function receiving the output or the result of the concatenator 110 and the first hidden state $h_{t-1}$ 124. The second cell state $c_t$ 162 may be passed through a tanh function 154 resulting in an output for the tanh function 154. An element-wise product 156 of the output for the tanh function 154 and the output gate 152 may be taken to generate a second hidden state $h_t$ 164.

Figure 2:
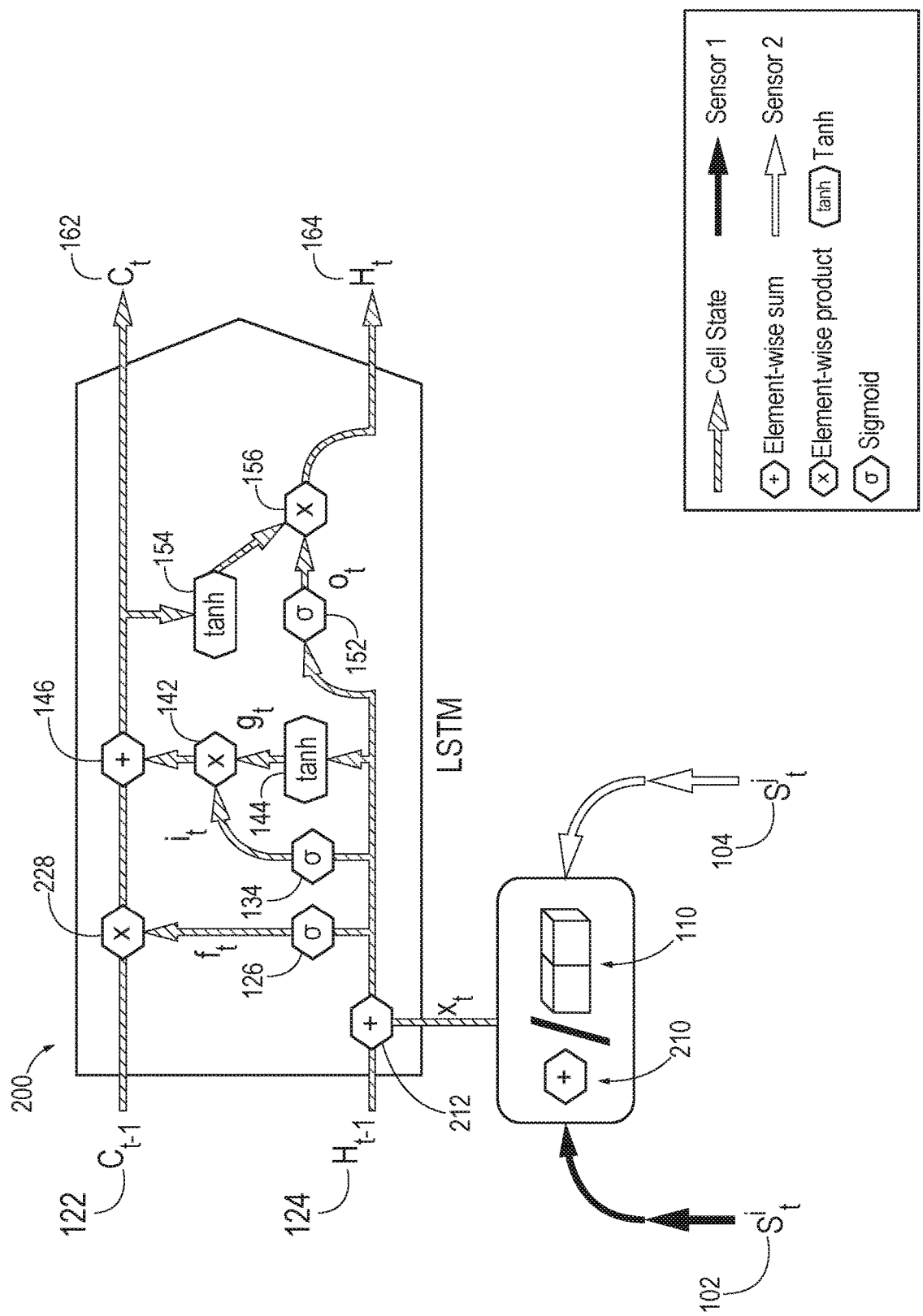
FIG. 2 is an illustration of an exemplary long short-term memory (LSTM) cell, according to one aspect.

FIG. 2 is an illustration of an exemplary LSTM cell, such as the LSTM cell 100 of FIG. 1, described in greater detail, according to one aspect. In FIG. 2, it may be seen that concatenation may be performed by the concatenator 110 or an element-wise sum 210 of the first sensor encoding $s_t^i$ 102 and the second sensor encoding $s_t^j$ 104 may be calculated. The output of the concatenator 110 or the element-wise sum 210 may be designated as $x_t$, which may be element-wise summed 212 with the first hidden state $h_{t-1}$ 124. The output of the first forget gate 126, which may include or employ the sigmoid function may be represented as $f_t$. The output of the sigmoid function associated with the input gate 134 may be represented as $i_t$. The output of the tanh function 144 associated with the input gate 134 may be represented as $g_t$. The output of the sigmoid function associated with the output gate 152 may be represented as $o_t$. According to one aspect, the element-wise product function 128 of the LSTM cell 100 of FIG. 1 may be implemented as an element-wise product function 228 of the first cell state $c_{t-1}$ 122 and the output $f_t$ of the first forget gate 126. In this regard, the output of the element-wise product function 142 may be element-wise summed 146 with the output of the element-wise product function 228 to thereby generate the second cell state $c_t$ 162.

$$x_t = \ldots + s_t^i + s_t^j \ldots \text{ (or) } \ldots s_t^i \oplus s_t^j \ldots,$$

$$f_t = \sigma(W_f * x_t + U_f * H_{t-1} + b_f),$$

$$i_t = \sigma(W_i * x_t U_i * H_{t-1} + b_i),$$

$$o_t = \sigma(W_o * x_t + U_o * h_{t-1} b_o), \quad (1)$$

$$g_t = \tanh(W_g * x_t + U_g * h_{t-1} + b_g), \quad (2)$$

$$c_t = c_{t-1} \odot f_t + i_t \odot g_t,$$

$$h_t = o_t \odot \tanh(c_t) \quad (3)$$

Late Recurrent Summation (LRS)

Figure 3:
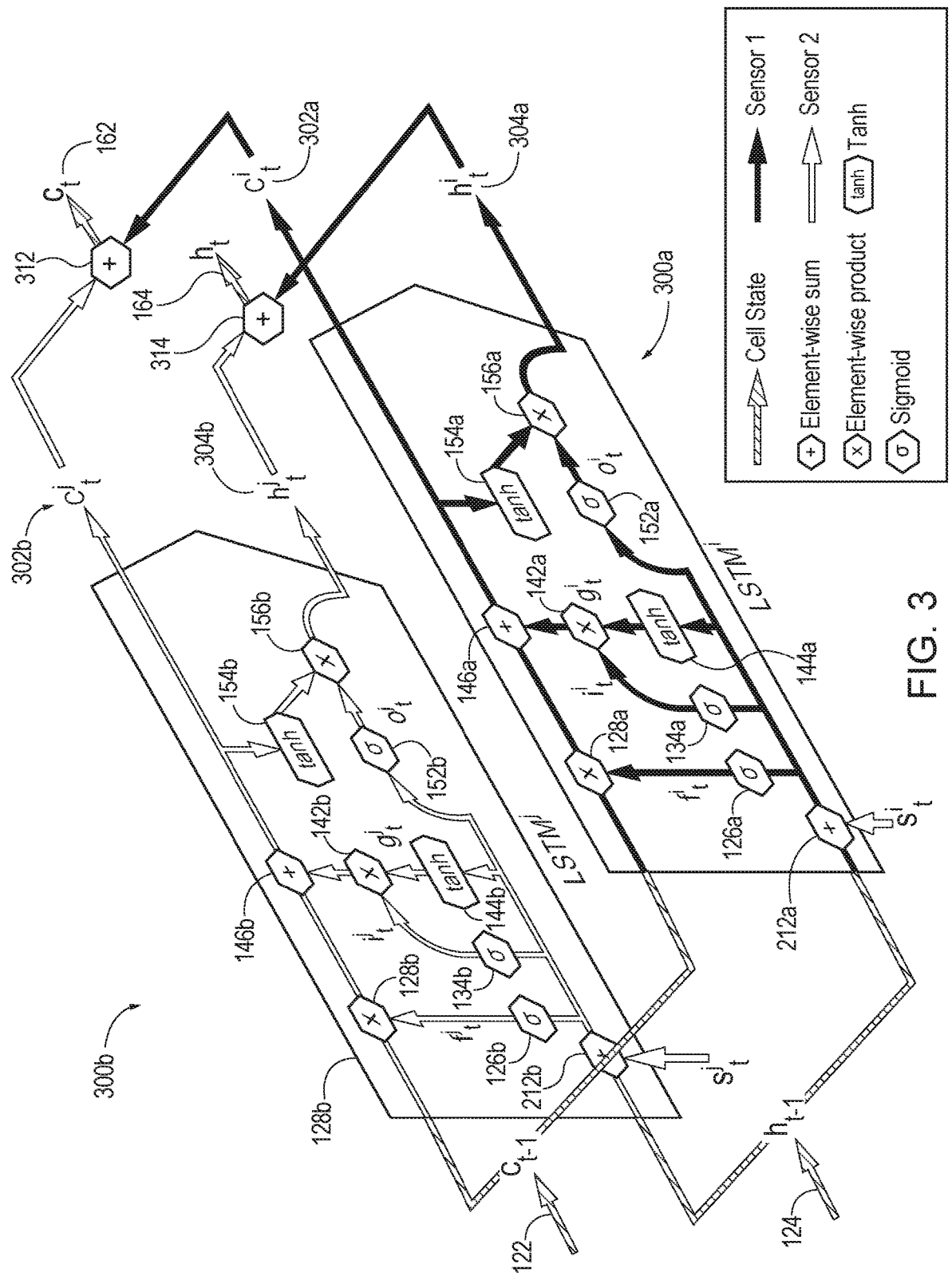
FIG. 3 is an illustration of an exemplary long short-term memory (LSTM) cell, according to one aspect.

FIG. 3 is an illustration of an exemplary LSTM cell including a first architecture 300a and a second architecture 300b, according to one aspect. While FIG. 3 is described with reference to merely the first architecture 300a and the second architecture 300b, additional architectures may be implemented in parallel in an array-like fashion for Late Recurrent Summation using M number of sensors.

The first architecture 300a may include a first gate, which may include an element-wise sum function 212a summing the first sensor encoding $s_t^i$ 102 with a first shared hidden state $h_{t-1}$ 124 and generating an output which may be passed to a first forget gate 126a, a first input gate 134a, a first tanh function 144a, and a first output gate 152a of the first architecture 300a. The first forget gate 126a may include or employ a sigmoid function and generate an output $f_t^i$. An element-wise product 128a of the output $f_t^i$ of the first forget gate 126a and a first shared cell state $c_{t-1}$ 122 may be calculated. The first shared hidden state $h_{t-1}$ 124 and the first shared cell state $c_{t-1}$ 122 may be shared or input into multiple architectures, such as the first architecture 300a, the second architecture 300b, a third architecture, etc. In this way, the first shared hidden state $h_{t-1}$ 124 and the first shared cell state $c_{t-1}$ 122 may be considered shared stated or common states.

The first input gate 134a may include or employ a sigmoid function and generate an output $i_t^i$. The first tanh function 144a may generate an output. The output $i_t^i$ of the first input gate 134a and the output of the first tanh function 144a may be passed to an element-wise product function 142a. The element-wise product function 142a may generate an output by calculating the element-wise product of the output $i_t^i$ of the first input gate 134a and the output of the first tanh function 144a. The output of the element-wise product function 142a may be element-wise summed 146a with the output of the element-wise product function 128a. An output of the element-wise sum function 146a may be a first partial shared cell state $c_t^i$ 302a. The first partial shared cell state $c_t^i$ 302a may be passed to a first tanh function 154a. The first output gate 152a may include or employ a sigmoid function and generate an output. The output of the first output gate 152a and an output of the first tanh function 154a may be passed to an element-wise product function 156a, which may generate a first partial shared hidden state $h_t^i$ 304a.

The second architecture 300b may include a first gate, which may include an element-wise sum function 212b summing the second sensor encoding $s_t^j$ 104 with the same first shared hidden state $h_{t-1}$ 124 (e.g., provided to the first architecture 300a) and generating an output which may be passed to a second forget gate 126b, a second input gate 134b, a second tanh function 144b, and a second output gate 152b of the second architecture 300b. The second forget gate 126b may include or employ a sigmoid function and generate an output $f_t^j$. An element-wise product 128b of the output $f_t^j$ of the second forget gate 126b and the same first shared cell state $c_{t-1}$ 122 (e.g., provided to the first architecture 300a) may be calculated.

The second input gate 134b may include or employ a sigmoid function and generate an output $i_t^j$. The second tanh function 144b may generate an output. The output $i_t^j$ of the second input gate 134b and the output of the second tanh function 144b may be passed to an element-wise product function 142b. The element-wise product function 142b may generate an output by calculating the element-wise product of the output $i_t^j$ of the second input gate 134b and the output of the second tanh function 144b. The output of the element-wise product function 142b may be element-wise summed 146b with the output of the element-wise product function 128b. An output of the element-wise sum function 146b may be a second partial shared cell state $c_t^j$ 302b. The second partial shared cell state $c_t^j$ 302b may be passed to a second tanh function 154b. The second output gate 152b may include or employ a sigmoid function and generate an output. The output of the second output gate 152b and an output of the second tanh function 154b may be passed to an element-wise product function 156b, which may generate a second partial shared hidden state $h_t^j$ 304b.

The second architecture 300b may be identical to the first architecture 300a, except that the second architecture 300b may receive the second sensor encoding $s_t^j$ 104 as an input rather than the first sensor encoding $s_t^i$ 102. Element-wise sum functions for a cell state gate 312 and a hidden state gate 314 may sum the first partial shared cell state $c_t^i$ 304a with the second partial shared cell state $c_t^j$ 304b and the first partial shared hidden state $h_t^i$ 302a with the second partial shared hidden state $h_t^j$ 302b, to generate a second shared cell state $c_t$ 162 and a second shared hidden state $h_t$ 164, respectively. Should additional architectures be implemented, the element-wise sum functions for the cell state gate 312 and the hidden state gate 314 may sum additional partial shared cell states and/or additional partial shared hidden states accordingly (e.g., $c_t^i + c_t^j + c_t^k$ or $h_t^i + h_t^j + h_t^k$).

According to one aspect of Late Recurrent Summation, there may be M copies of the LSTM units or architectures (e.g., 300a, 300b, etc. or one for each sensor). For each modality, a separate forget, input, output and cell state may be calculated. Weights, W*, U*, and biases, b*, that transform the input space for each gate are unique for each modality but may be shared across time. Thus, each LSTM unit or architecture may receive information from the states of the past time step via the shared states (e.g., the first shared hidden state $h_{t-1}$ 124 and the first shared cell state $c_{t-1}$ 122) and the input from the current time step, $s_t$ (e.g., corresponding sensor input).

Now, instead of having separate states of each LSTM unit of a sensor, all the architectures receive the same shared states or common states (e.g., the first shared hidden state $h_{t-1}$ 124 and the first shared cell state $c_{t-1}$ 122) obtained from the previous time-step. In this way, fused representations may be propagated temporally. By sharing the past shared cell state $c_{t-1}$ across all sensors, the model may individually decide whether to retain or discard memory for each modality. As discussed above, the partial shared hidden and cell states are added to produce a combined representation for the second shared cell state $c_t$ and the second shared hidden state $h_t$ that may be sent or passed to the next time step.

$$f_t^i = \sigma(W_f^i * s_t^i + U_f^i * h_{t-1} + b_f^i),$$

$$i_g^i = \sigma(W_i^i * s_t^i + U_i^i * h_{t-1} + b_i^i),$$

$$o_t^i = \sigma(W_o^i * s_t^i + U_g^i * h_{t-1} + b_g^i),$$

$$g_t^i = \tanh(W_g^i * s_t^i + U_g^i * h_{t-1} + b_g^i), \quad (4)$$

$$c_t^i = c_{t-1} \odot f_t^i + i_t^i \odot g_t^i,$$

$$h_t^i = o_t^i \odot \tanh(c_t^i), \quad (5)$$

$$c_t = \sum_{i=1}^M c_t^i, h_t = \sum_{i=1}^M h_t^i \quad (6)$$

In this regard, the architecture disclosed in FIG. 3 (e.g., including the first architecture 300a and the second architecture 300b) may classify what a driver is doing based on sensor encodings, such as the first sensor encoding $s_t^i$ 102 and the second sensor encoding $s_t^j$ 104, from two or more sensors (e.g., a video or image capture sensor and CAN bus) and predict what an output, such as vehicle steering should be to approach a driving scenario, based on the respective encodings $s_t^i$, $s_t^j$. Examples of different types of sensor encodings may include image capture, video, LiDAR, CAN bus, tactile sensors, etc. Further, each one of the first architecture 300a, the second architecture 300b, a third architecture (no shown), a fourth architecture, etc., may include its own forget gate, input gate, output gate, etc. and may be configured to compute its own candidate or partially computed cell state (e.g., first partial shared cell state $c_t^i$ 302a, second partial shared cell state $c_t^j$ 302b, third partial shared cell state $c_t^k$ (not shown in FIG. 3), etc.), while sharing the common hidden state (e.g., first hidden state $h_{t-1}$ 124, second hidden state $h_t$ 164, for the following stage) and the common cell state (e.g., first shared cell state $c_{t-1}$ 122, second shared cell state $c_t$ 162 for the following stage), and is repeated over time t.

Figure 4:
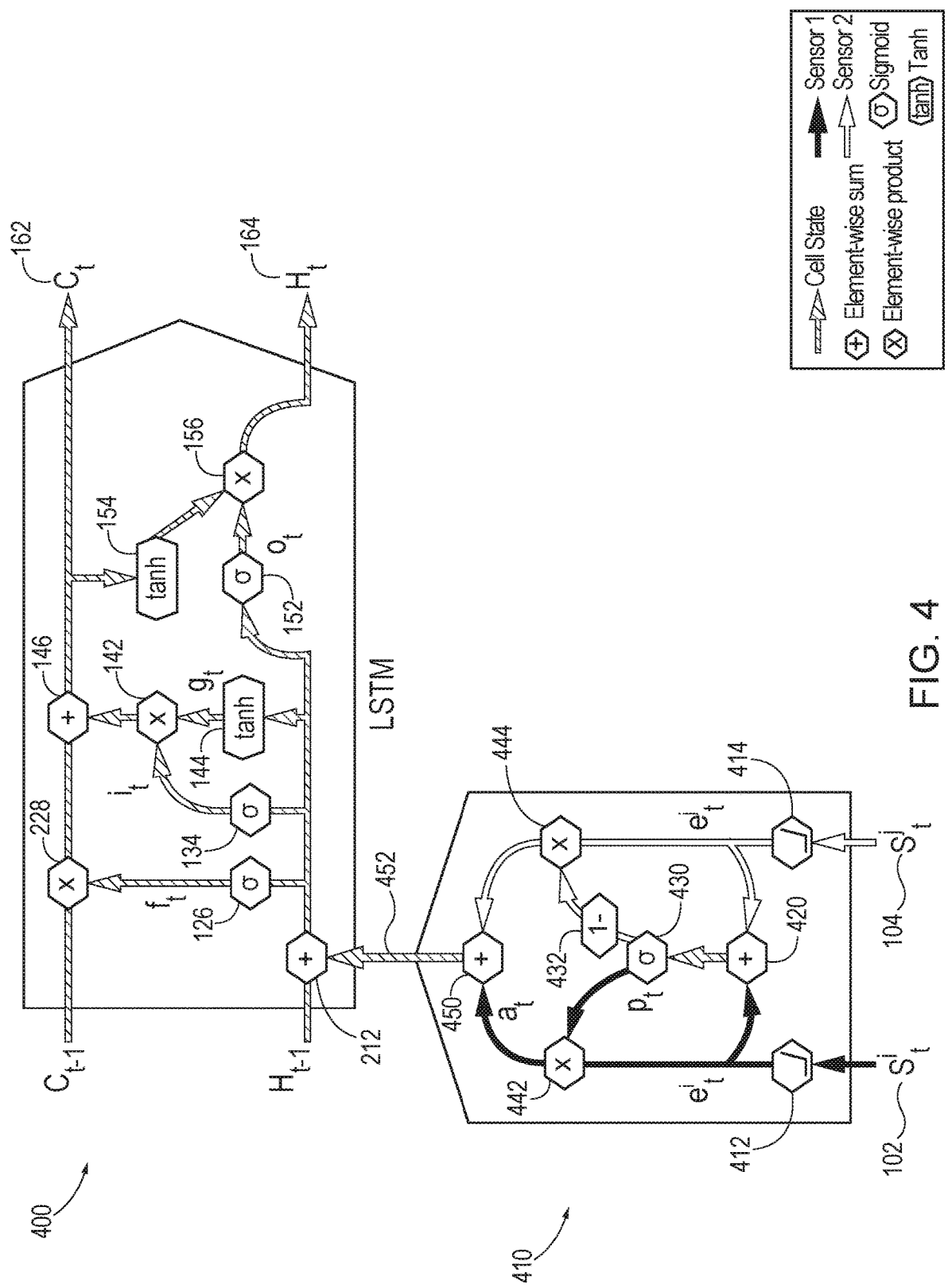
FIG. 4 is an illustration of an exemplary long short-term memory (LSTM) cell and a fusion cell, according to one aspect.

FIG. 4 is an illustration of an exemplary LSTM cell 400 and a fusion cell 410, according to one aspect. The LSTM cell 400 may be identical to the LSTM cell 200 of FIG. 2 with the exception of the concatenator 110 and/or the element-wise sum 210 of the first sensor encoding $s_t^i$ 102 and the second sensor encoding $s_t^j$ 104. Instead, an output of the fusion cell 410 may be input to the element-wise sum function 212, as will be discussed herein.

The output of the fusion cell 410 may be element-wise summed 212 with the first hidden state $h_{t-1}$ 124. The output of the first forget gate 126, which may include or employ the sigmoid function may be represented as $f_t$. The output of the sigmoid function associated with the input gate 134 may be represented as $i_t$. The output of the tanh function 144 associated with the input gate 134 may be represented as $g_t$. The output of the sigmoid function associated with the output gate 152 may be represented as $o_t$. The LSTM cell 400 may include the element-wise product function 228 of the first cell state $c_{t-1}$ 122 and the output $f_t$ of the first forget gate 126. The output of the element-wise product function 142 may be element-wise summed 146 with the output of the element-wise product function 228 to generate the second cell state $c_t$ 162.

The fusion cell 410 may include a first rectifier 412, a second rectifier 414, a fusion gate 420, a sigmoid function gate 430, a function gate 432, a first element-wise product gate 442, a second element-wise product gate 444, and an output gate 450. The first rectifier 412 or the second rectifier 414 may be a rectified linear unit (ReLU).

The first rectifier 412 may receive the first sensor encoding $s_t^i$ from the first sensor and may generate a first adjusted sensor encoding $e_t^i$. The first adjusted sensor encoding may be calculated as $e_t^i = \text{relu}(W_e^i * s_t^i)$. The second rectifier 414 may receive the second sensor encoding $s_t^j$ from the second sensor and may generate a second adjusted sensor encoding $e_t^j$. The first adjusted sensor encoding $e_t^i$ may be passed to the fusion gate 420 and the first element-wise product gate 442. The second adjusted sensor encoding $e_t^j$ may be passed to the fusion gate 420 and the second element-wise product gate 444. The fusion gate 420 may receive the first adjusted sensor encoding $e_t^i$ and the second adjusted sensor encoding $e_t^j$ and generate a fusion gate result $p_t^k$, which may be passed to the sigmoid function gate 430. The fusion gate result may be calculated as $p_t^k = \sigma(\Sigma_{i=1}^{M} W_p^i * e_t^i)$, $\forall k \in [1, m-1]$. The output of the sigmoid function gate 430 may be passed to the first element-wise product gate 442 and the function gate 432. The function gate 432 may calculate a $(1-p_t^k)$ value. The first element-wise product gate 442 may receive the fusion gate result $p_t^k$ and the first adjusted sensor encoding $e_t^i$ and generate a first product, which may be passed to the output gate 450 to be element-wise summed. The second element-wise product gate 444 may receive the $(1-p_t^i)$ from the function gate 432 and the second adjusted sensor encoding $e_t^j$ and generate a second product, which may be passed to the output gate 450 to be element-wise summed with the first product. The first element-wise product gate 442 or the second element-wise product 444 gate may employ an element-wise product function to generate the first product and/or the second product. The fusion gate 450 may employ an element-wise sum function and a sigmoid function to generate the fusion gate result $p_t^k$ based on the first adjusted sensor encoding $e_t^i$ and the second adjusted sensor encoding $e_t^j$.

In this regard, the output gate 450 may receive the first product and the second product and generate a fused state $a_t$ 452, which may be passed as the input to the element-wise sum function 212 of the LSTM cell 400. In this way, the fusion cell 410 may be utilized to generate inputs for LSTM cells by preprocessing the sensor encodings. As previously discussed, the fused state $a_t$ 452 may be element-wise summed 212 with the first hidden state $h_{t-1}$ 124. The output gate 450 may employ an element-wise sum function to generate the fused state $a_t$ 452 based on the first product and the second product. The fused state $a_t$ 452 may be calculated as $a_t = (\Sigma_{k=1}^{M-1} p_t^k \odot) + (1 - \Sigma_{k=1}^{M-1} p_t^k) \lfloor e_t^k$. The fused state $a_t$ 452 may be input to a first gate (e.g., element-wise sum 212) of the LSTM cell employing an element-wise sum function summing the fused state $a_t$ 452 and the hidden state $h_{t-1}$. In this way, an output of the first gate or element-wise sum 212 of the LSTM cell 400 may be fed as an input to a forget gate of the LSTM cell 400.

Figure 5A:
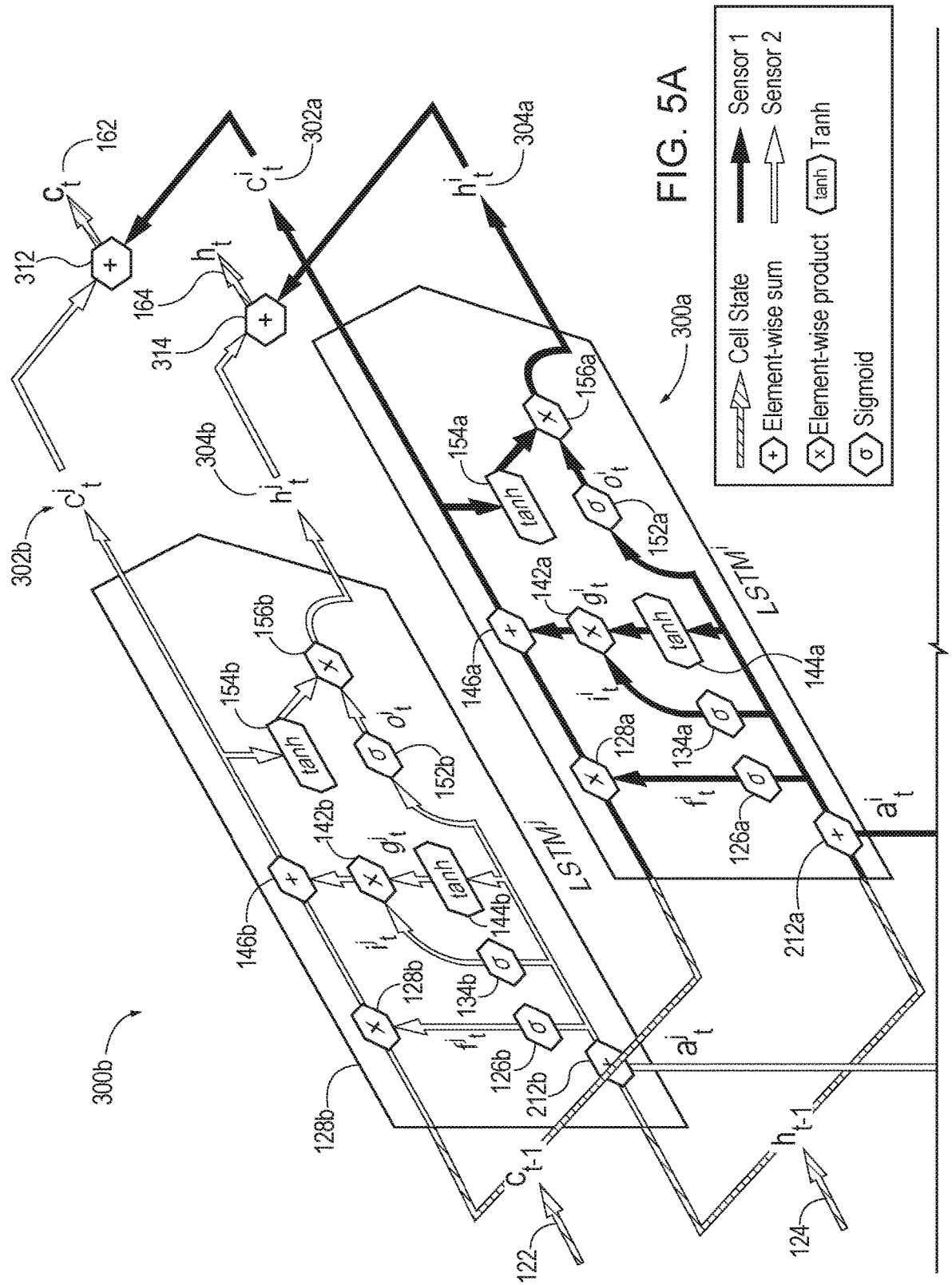
FIGS. 5A-5B are illustrations of an exemplary long short-term memory (LSTM) cell and a fusion cell, according to one aspect.
Figure 5B:
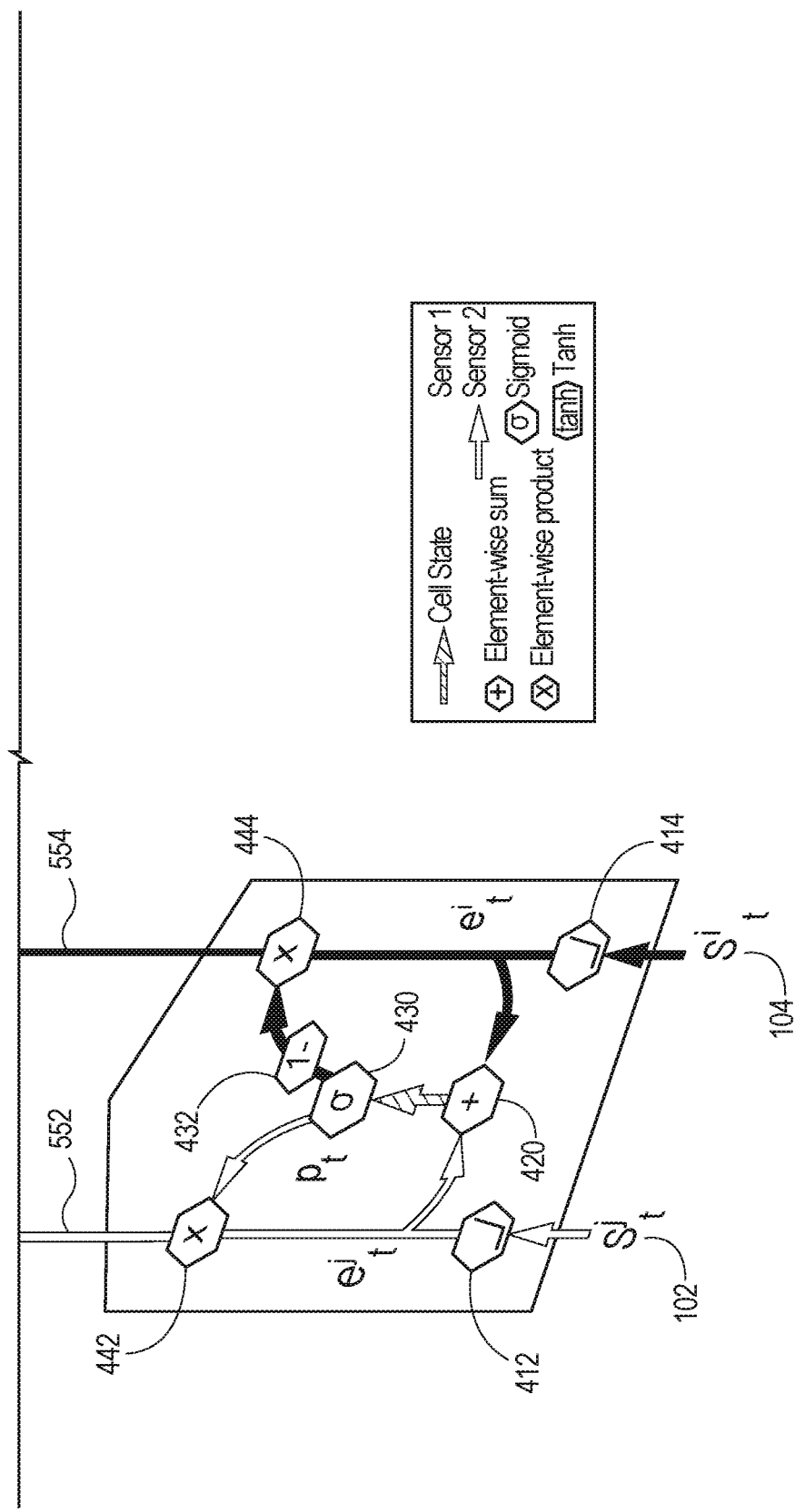

FIGS. 5A-5B are illustrations of an exemplary LSTM cell and a fusion cell, according to one aspect. The architecture of FIGS. 5A-5B may be identical or similar to a combination of the LSTM cell including the first architecture 300a and the second architecture 300b of FIG. 3 and the fusion cell 410, which may be modified slightly. As previously discussed, while FIGS. 5A-5B are described with reference to merely the first architecture 300a and the second architecture 300b, additional architectures may be implemented in parallel in an array-like fashion for Late Recurrent Summation using M number of sensors, each having an architecture, structure, and/or configuration identical to the first architecture 300a, the second architecture 300b, etc.

For example, with reference to FIG. 5A, the first architecture 300a may include the element-wise sum function 212a summing the product or output associated with the second element-wise product gate 444 with the first shared hidden state $h_{t-1}$ 124. The element-wise sum function 212a may generate an output which may be passed to the first forget gate 126a, the first input gate 134a, the first tanh function 144a, and the first output gate 152a of the first architecture 300a. The first forget gate 126a may include or employ the sigmoid function and generate an output $f_t^i$. The element-wise product 128a of the output $f_t^i$ of the first forget gate 126a and the first shared cell state $c_{t-1}$ 122 may be calculated.

The first input gate 134a may include or employ the sigmoid function and generate an output $i_t^i$. The first tanh function 144a may generate an output. The output $i_t^i$ of the first input gate 134a and the output of the first tanh function 144a may be passed to the element-wise product function 142a. The element-wise product function 142a may generate an output by calculating the element-wise product of the output $i_t^i$ of the first input gate 134a and the output of the first tanh function 144a. The output of the element-wise product function 142a may be element-wise summed 146a with the output of the element-wise product function 128a. The output of the element-wise sum function 146a may be the first partial shared cell state $c_t^i$ 302a. The first partial shared cell state $c_t^i$ 302a may be passed to the first tanh function 154a. The first output gate 152a may include or employ the sigmoid function and generate an output. The output of the first output gate 152a and the output of the first tanh function 154a may be passed to the element-wise product function 156a, which may generate the first partial shared hidden state $h_t^i$ 304a.

The second architecture 300b may include the first gate, which may include the element-wise sum function 212b summing the second sensor encoding $s_t^j$ 104 with the same first shared hidden state $h_{t-1}$ 124 (e.g., provided to the first architecture 300a) and generating the output which may be passed to the second forget gate 126b, the second input gate 134b, the second tanh function 144b, and the second output gate 152b of the second architecture 300b. The second forget gate 126b may include or employ the sigmoid function and generate an output $f_t^j$. The element-wise product 128b of the output $f_t^j$ of the second forget gate 126b and the same first shared cell state $c_{t-1}$ 122 (e.g., provided to the first architecture 300a) may be calculated.

The second input gate 134b may include or employ the sigmoid function and generate an output $i_t^j$. The second tanh function 144b may generate an output. The output $i_t^j$ of the second input gate 134b and the output of the second tanh function 144b may be passed to the element-wise product function 142b. The element-wise product function 142b may generate an output by calculating the element-wise product of the output $i_t^j$ of the second input gate 134b and the output of the second tanh function 144b. The output of the element-wise product function 142b may be element-wise summed 146b with the output of the element-wise product function 128b. The output of the element-wise sum function 146b may be the second partial shared cell state $c_t^i$ 302b. The second partial shared cell state $c_t^i$ 302b may be passed to the second tanh function 154b. The second output gate 152b may include or employ the sigmoid function and generate an output. The output of the second output gate 152b and the output of the second tanh function 154b may be passed to the element-wise product function 156b, which may generate the second partial shared hidden state $h_t^j$ 304b.

As previously noted, the second architecture 300b may be identical to the first architecture 300a, except that the second architecture 300b may receive the second sensor encoding $s_t^j$ 104 as the input rather than the first sensor encoding $s_t^i$ 102. Element-wise sum functions for the cell state gate 312 and the hidden state gate 314 may sum the first partial shared cell state $c_t^i$ 304a with the second partial shared cell state $c_t^j$ 304b and the first partial shared hidden state $h_t^i$ 302a with the second partial shared hidden state $h_t^j$ 302b, to generate the second shared cell state $c_t$ 162 and the second shared hidden state $h_t$ 164, respectively.

The fusion cell of FIG. 5B may be identical or similar to the fusion cell 410
of FIG. 4, except that the output gate 450 is removed, thereby enabling the first product 552 of the first element-wise product gate 442 and the second product 554 of the second element-wise product gate 444 to be passed to the element-wise sum function 212b of the second architecture 300b and the element-wise sum function 212a of the first architecture 300a, respectively.

For example, the fusion cell of FIG. 5B may include the first rectifier 412, the second rectifier 414, the fusion gate 420, the sigmoid function gate 430, the function gate 432, the first element-wise product gate 442, and the second element-wise product gate 444. The first rectifier 412 may receive the first sensor encoding $s_t^i$ from the first sensor and may generate a first adjusted sensor encoding $e_t^i$. The second rectifier 414 may receive the second sensor encoding $s_t^j$ from the second sensor and may generate a second adjusted sensor encoding $e_t^j$. The first adjusted sensor encoding $e_t^i$ may be passed to the fusion gate 420 and the first element-wise product gate 442. The second adjusted sensor encoding $e_t^j$ may be passed to the fusion gate 420 and the second element-wise product gate 444. The fusion gate 420 may receive the first adjusted sensor encoding $e_t^i$ and the second adjusted sensor encoding $e_t^j$ and generate a fusion gate result $p_t^k$, which may be passed to the sigmoid function gate 430. The output of the sigmoid function gate 430 may be passed to the first element-wise product gate 442 and the function gate 432. The function gate 432 may calculate a $(1-p_t^k)$ value.

The first element-wise product gate 442 may receive the fusion gate result $p_t^k$ and the first adjusted sensor encoding $e_t^i$ and generate the first product 552, which may be passed as the input to the element-wise sum function 212b of the second architecture 300b. The second element-wise product gate 444 may receive the $(1-p_t^k)$ from the function gate 432 and the second adjusted sensor encoding $e_t^j$ and generate the second product 554, which may be passed as the input to the element-wise sum function 212a of the first architecture 300a. In this way, the first product 552 may be an input to a first gate (e.g., the element-wise sum function 212b) of the second architecture 300b within the LSTM cell employing an element-wise sum function summing the first product 552 and the hidden state $h_{t-1}$. Similarly, the second product 554 may be input to a first gate (e.g., the element-wise sum function 212a) of the first architecture 300a within the LSTM cell employing an element-wise sum function summing the second product 554 and the hidden state $h_{t-1}$.

$$e_t^i = relu(W_e^i * s_t^i), \quad (7)$$

$$p_t^k = \sigma\left(\sum_{i=1}^{M} W_p^i * e_t^i\right), \forall k \in [1, m-1] \quad (8)$$

$$a_t = \left(\sum_{k=1}^{M-1} p_t^k \odot e_t^k\right) + \left(1 - \sum_{k=1}^{M-1} p_t^k\right) \odot e_t^k, \quad (9)$$

$$f_t = \sigma(W_f * a_t + U_f * H_{t-1} + b_f),$$

$$i_t = \sigma(W_i * a_t + U_i * H_{t-1} + b_i),$$

$$o_t = \sigma(W_o * a_t + U_o * h_{t-1} + b_o),$$

$$g_t = \tanh(W_g * a_t + U_g * h_{t-1} + b_g), \quad (10)$$

$$c_t = c_{t-1} \odot f_t + i_t \odot g_t,$$

$$h_t = o_t \odot \tanh(c_t), \quad (11)$$

$$e_t^i = relu(W_e^i * s_t^i) \quad (12)$$

$$p_t^k = \sigma\left(\sum_{i=1}^{M} W_p^i * e_t^i\right), \forall k \in [1, M-1], \quad (13)$$

$$a_t^i = \begin{cases} p_t^i \odot e_t^i & \text{if } i \in [1, M-1], \\ \left(1 - \sum_{k=1}^{M-1} p_t^k\right) \odot e_t^i & \text{if } i = M \end{cases}$$

$$f_t^i = \sigma(W_f^i * a_t^i + U_f^i * h_{t-1} + b_f^i),$$

$$i_t^i = \sigma(W_i^i * a_t^i + U_i^i * h_{t-1} + b_i^i),$$

$$o_t^i = \sigma(W_o^i * a_t^i + U_o^i * h_{t-1} + b_o^i),$$

$$g_t^i = \tanh(W_g^i * a_t^i + U_g^i * h_{t-1} + b_g^i), \quad (14)$$

$$c_t^i = c_{t-1} \odot f_t^i + i_t^i \odot g_t^i,$$

$$h_t^i = o_t^i \tanh(c_t^i), \quad (15)$$

$$c_t = \sum_{i=1}^{M} c_t^i, h_t = \sum_{i=1}^{M} h_t^i \quad (16)$$

Figure 6:
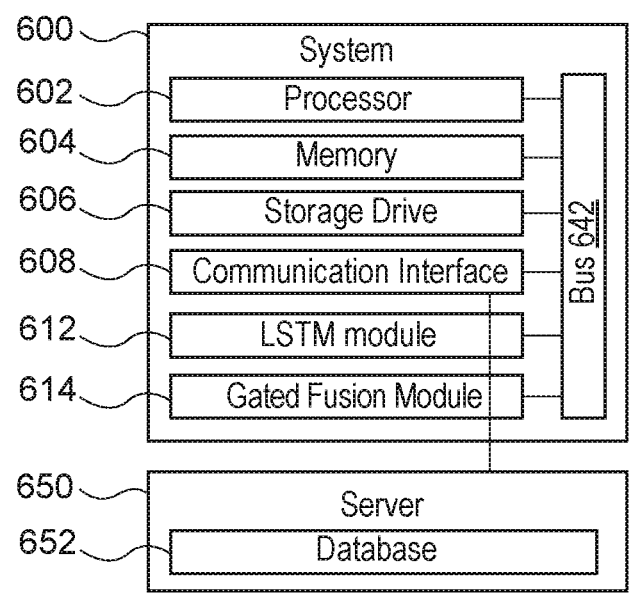
FIG. 6 is an exemplary component diagram of a system for sensor fusion associated with the long short-term memory (LSTM) cells of FIGS. 1-5, according to one aspect.

FIG. 6 is an exemplary component diagram of a system 600 for sensor fusion associated with the LSTM cells of FIGS. 1-5, according to one aspect. The system for sensor fusion may include a processor 602, a memory 604, a storage drive 606, a communication interface 608, an LSTM module 612, a gated fusion module 614, and a bus 642. The LSTM module 612 and/or the gated fusion module 614 may be implemented via the processor 602 and execute or perform one or more of the functions described above with reference to FIGS. 1-5, such as performing the element-wise sum function, the element-wise product function, the tanh function, the sigmoid function, etc. The system 600 for sensor fusion may be implemented within a vehicle and be associated with one or more vehicle systems. In this regard, driver behavior classification and/or driver behavior prediction may be performed based on the inputs received, such as the first sensor encoding $s_t^i$ and the second sensor encoding $s_t^j$ from the first sensor 102 and the second sensor 104, respectively. As discussed, any number (M number) of sensors or modalities may be considered although merely two sensors (i.e., associated with the first sensor encoding $s_t^i$ and the second sensor encoding $s_t^j$) are discussed herein.

Figure 7:
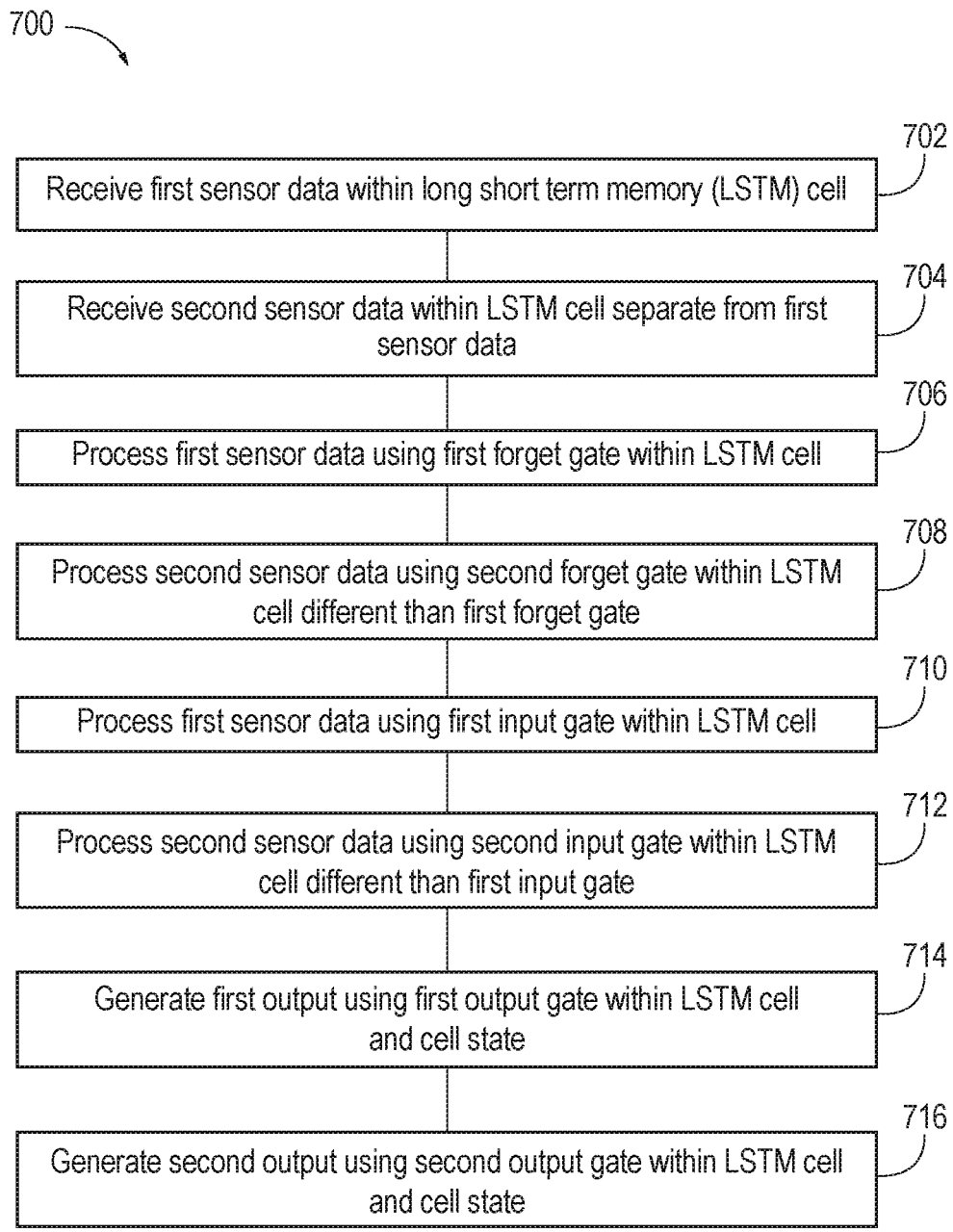
FIG. 7 is an exemplary flow diagram of a method for sensor fusion associated with the long short-term memory (LSTM) cells of FIGS. 1-5, according to one aspect.

FIG. 7 is an exemplary flow diagram of a method 700 for sensor fusion associated with the LSTM cells of FIGS. 1-5, according to one aspect. The method 700 may include receiving 702 a first sensor data within the LSTM cell, receiving 704 a second sensor data within LSTM cell separate from the first sensor data, processing 706 the first sensor data using a first forget gate within the LSTM cell, processing 708 the second sensor data using a second forget gate within the LSTM cell different than the first forget gate, processing 710 the first sensor data using a first input gate within the LSTM cell, processing 712 the second sensor data using a second input gate within the LSTM cell different than the first input gate, generating 714 a first output using a first output gate within the LSTM cell and a cell state, and generating 716 a second output using a second output gate within the LSTM cell and the cell state.

Figure 8:
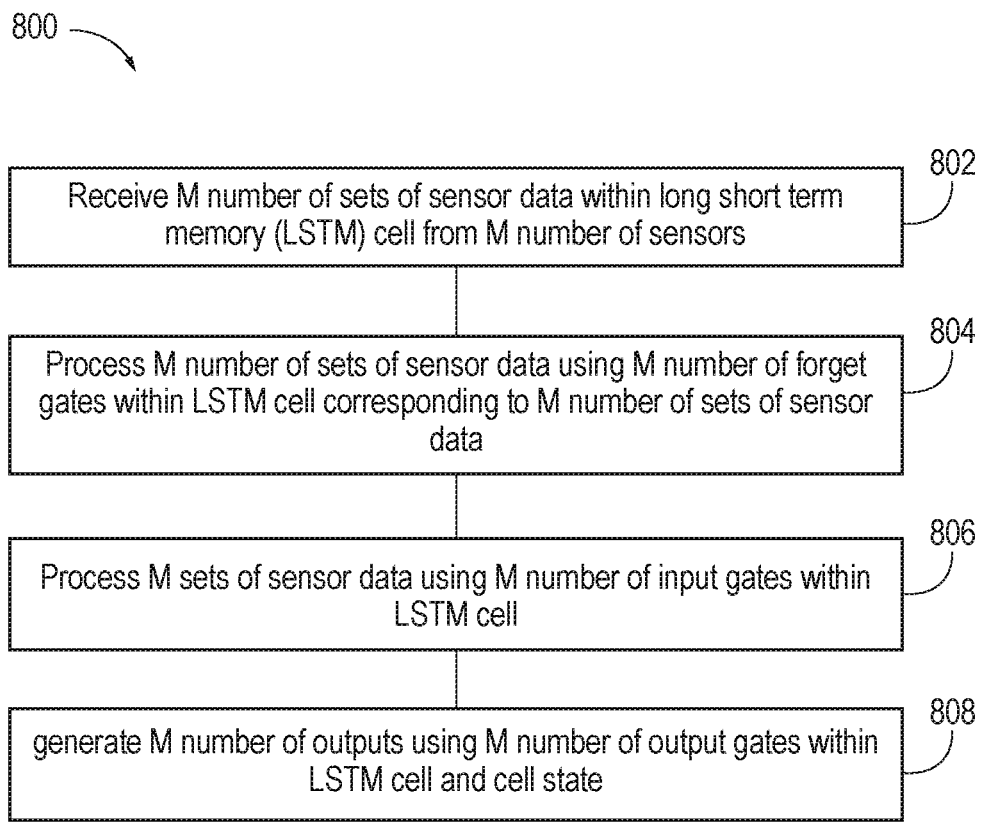
FIG. 8 is an exemplary flow diagram of a method for sensor fusion associated with the long short-term memory (LSTM) cells of FIGS. 1-5, according to one aspect.

FIG. 8 is an exemplary flow diagram of a method for sensor fusion associated with the LSTM cells of FIGS. 1-5, according to one aspect. The method 800 may include receiving 802 M number of sets of sensor data within the LSTM cell from M number of sensors, processing 804 M number of sets of sensor data using M number of forget gates within LSTM cell corresponding to the M number of sets of sensor data, processing 806 M sets of sensor data using M number of input gates within LSTM cell, and generating 808 M number of outputs (to determine an updated cell state and updated hidden state) using M number of output gates within LSTM cell and the previous cell state.

Figure 9:
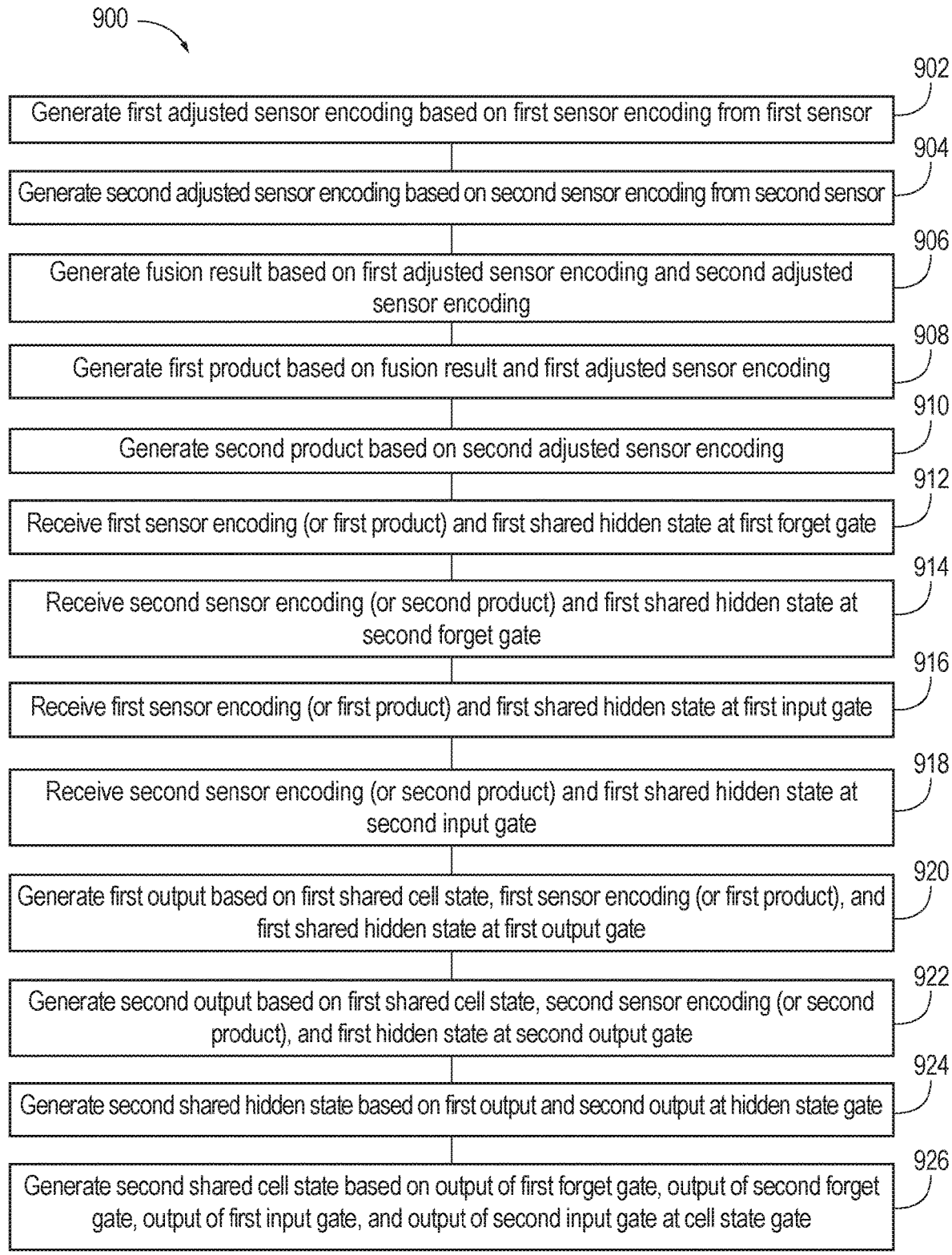
FIG. 9 is an exemplary flow diagram of a method for sensor fusion associated with the long short-term memory (LSTM) cells of FIGS. 1-5, according to one aspect.

FIG. 9 is an exemplary flow diagram of a method 900 for sensor fusion associated with the LSTM cells of FIGS. 1-5, according to one aspect. The method 900 for sensor fusion may include generating 902 a first adjusted sensor encoding based on a first sensor encoding from a first sensor, generating 904 a second adjusted sensor encoding based on a second sensor encoding from a second sensor, generating 906 a fusion result based on the first adjusted sensor encoding and the second adjusted sensor encoding, generating 908 a first product based on the fusion result and the first adjusted sensor encoding, generating 910 a second product based on the second adjusted sensor encoding, receiving 912 either the first sensor encoding or the first product and the first shared hidden state at a first forget gate of an LSTM cell, receiving 914 the second sensor encoding or the second product and the first shared hidden state at a second forget gate of the LSTM cell, receiving 916 the first sensor encoding or the first product and the first shared hidden state at a first input gate of the LSTM cell, receiving 918 the second sensor encoding or the second product and the first shared hidden state at a second input gate of the LSTM cell, generating 920 a first output based on the first shared cell state, the first sensor encoding or the first product, and the first shared hidden state at the first output gate, generating 922 a second output based on the first shared cell state, the second sensor encoding or the second product), and the first hidden state at the second output gate, generating 924 a second shared hidden state based on the first output and the second output at a hidden state gate, and generating 926 a second shared cell state based on an output of first forget gate, an output of second forget gate, an output of first input gate, and an output of second input gate at a cell state gate.

Figure 10:
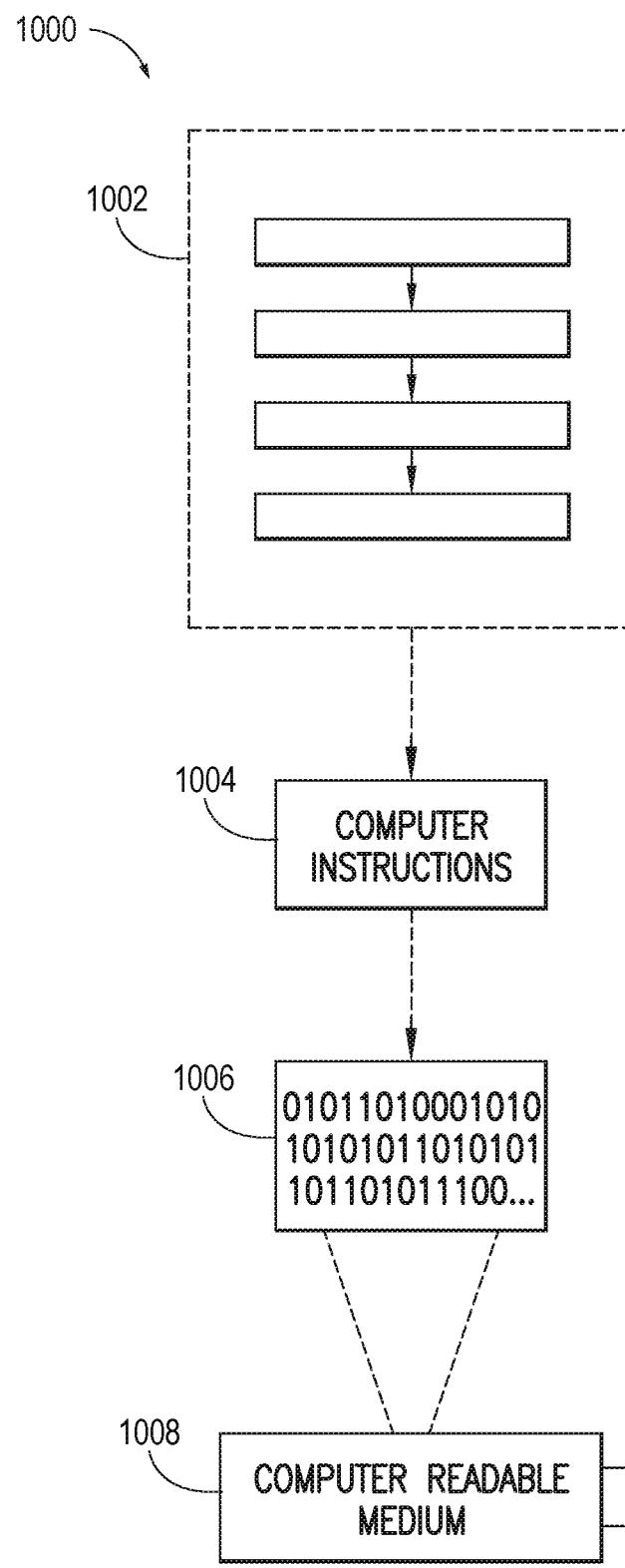
FIG. 10 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 10, wherein an implementation 1000 includes a computer-readable medium 1008, such as a CD-R, DVD-R, flash drive, a platter of a hard disk drive, etc., on which is encoded computer-readable data 1006. This encoded computer-readable data 1006, such as binary data including a plurality of zero's and one's as shown in 1006, in turn includes a set of processor-executable computer instructions 1004 configured to operate according to one or more of the principles set forth herein. In this implementation 1000, the processor-executable computer instructions 1004 may be configured to perform a method 1002, such as the method 700 of FIG. 7, the method 800 of FIG. 8, or the method 900 of FIG. 9. In another aspect, the processor-executable computer instructions 1004 may be configured to implement a system, such as the system 600 of FIG. 6. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 11:
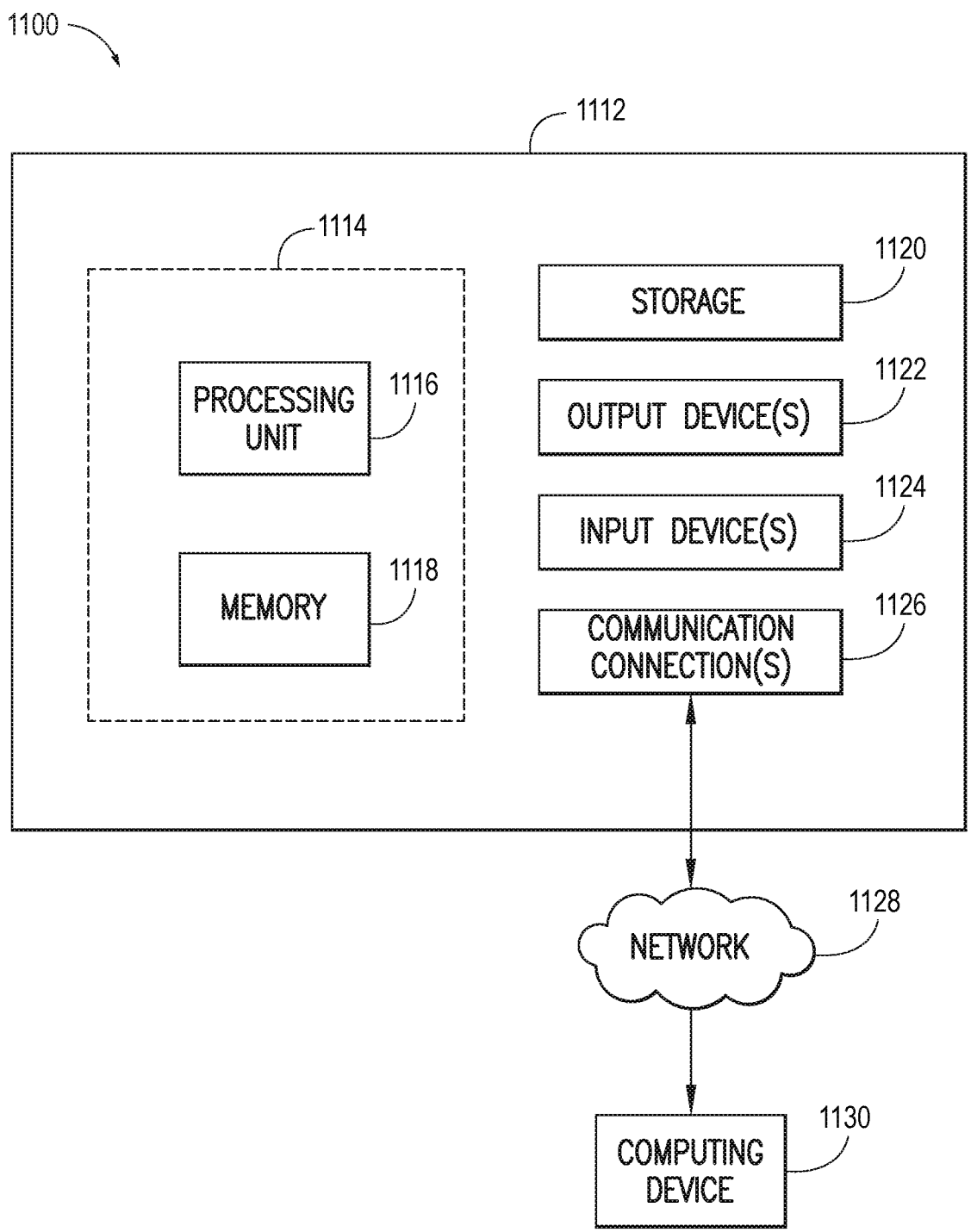
FIG. 11 is an illustration of an example computing environment where one or more of the provisions set forth herein are implemented, according to one aspect.

FIG. 11 and the following discussion provide a description of a suitable computing environment to implement aspects of one or more of the provisions set forth herein. The operating environment of FIG. 11 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 11 illustrates a system 1100 including a computing device 1112 configured to implement one aspect provided herein. In one configuration, the computing device 1112 includes at least one processing unit 1116 and memory 1118. Depending on the exact configuration and type of computing device, memory 1118 may be volatile, such as RAM, nonvolatile, such as ROM, flash memory, etc., or a combination of the two. This configuration is illustrated in FIG. 11 by dashed line 1114.

In other aspects, the computing device 1112 includes additional features or functionality. For example, the computing device 1112 may include additional storage such as removable storage or non-removable storage, including, but not limited to, magnetic storage, optical storage, etc. Such additional storage is illustrated in FIG. 11 by storage 1120. In one aspect, computer readable instructions to implement one aspect provided herein are in storage 1120. Storage 1120 may store other computer readable instructions to implement an operating system, an application program, etc. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1112. Any such computer storage media is part of the computing device 1112.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1112 includes input device(s) 1124 such as keyboard, mouse, pen, voice input device, touch input device, infrared cameras, video input devices, or any other input device. Output device(s) 1122 such as one or more displays, speakers, printers, or any other output device may be included with the computing device 1112. Input device(s) 1124 and output device(s) 1122 may be connected to the computing device 1112 via a wired connection, wireless connection, or any combination thereof. In one aspect, an input device or an output device from another computing device may be used as input device(s) 1124 or output device(s) 1122 for the computing device 1112. The computing device 1112 may include communication connection(s) 1126 to facilitate communications with one or more other devices 1130, such as through network 1128, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fusion cell associated with a long short-term memory (LSTM) cell, comprising:
a first rectifier receiving a first sensor encoding $s_t^i$ from a first sensor and generating a first adjusted sensor encoding $e_t^i$;
a second rectifier receiving a second sensor encoding $s_t^j$ from a second sensor and generating a second adjusted sensor encoding $e_t^j$;
a fusion gate receiving the first adjusted sensor encoding $s_t^i$ and the second adjusted sensor encoding $e_t^j$ and generating a fusion gate result $p_t^k$;
a first element-wise product gate receiving the fusion gate result $p_t^k$ and the first adjusted sensor encoding $e_t^j$ and generating a first product;
a second element-wise product gate receiving $(1-p_t^k)$ and the second adjusted sensor encoding $e_t^j$ and generating a second product; and
an output gate receiving the first product and the second product and generating a fused state $a_t$.

2. The fusion cell of claim 1, wherein the first rectifier or the second rectifier is a rectified linear unit (ReLU).

3. The fusion cell of claim 1, wherein the fusion gate employs an element-wise sum function and a sigmoid function to generate the fusion gate result $p_t^k$ based on the first adjusted sensor encoding $e_t^i$ and the second adjusted sensor encoding $e_t^j$.

4. The fusion cell of claim 1, wherein the first element-wise product gate or the second element-wise product gate employ an element-wise product function to generate the first product or the second product, respectively.

5. The fusion cell of claim 1, wherein the output gate employs an element-wise sum function to generate the fused state $a_t$ based on the first product and the second product.

6. The fusion cell of claim 1, wherein the first adjusted sensor encoding $e_t^i = \text{relu}(W_e^i * s_t^i)$.

7. The fusion cell of claim 1, wherein the fusion gate result $p_t^k = \sigma(\Sigma_{i=1}^M W_p^i * e_t^i)$, $\forall k \in [1, m-1]$.

8. The fusion cell of claim 1, wherein the fused state $a_t = (\Sigma_{k=1}^{M-1} p_t^k \odot e_t^k) + (1 - \Sigma_{k=1}^{M-1} p_t^k) \odot e_t^k$.

9. The fusion cell of claim 1, wherein the fused state $a_t$ is input to a first gate of the LSTM cell employing an element-wise sum function summing the fused state $a_t$ and a hidden state $h_{t-1}$.

10. The fusion cell of claim 9, wherein an output of the first gate of the LSTM cell is passed as an input to a forget gate of the LSTM cell.

11. A fusion cell associated with a long short-term memory (LSTM) cell, comprising:
 a first rectifier receiving a first sensor encoding $s_t^i$ from a first sensor and generating a first adjusted sensor encoding $e_t^i$;
 a second rectifier receiving a second sensor encoding $s_t^j$ from a second sensor and generating a second adjusted sensor encoding $e_t^j$;
 a fusion gate receiving the first adjusted sensor encoding $e_t^i$ and the second adjusted sensor encoding $e_t^j$ and generating a fusion gate result $p_t^k$;
 a first element-wise product gate receiving the fusion gate result $p_t^k$ and the first adjusted sensor encoding $e_t^i$ and generating a first product; and
 a second element-wise product gate receiving $(1 - p_t^k)$ and the second adjusted sensor encoding $e_t^j$ and generating a second product.

12. The fusion cell of claim 11, wherein the first adjusted sensor encoding $e_t^i = \text{relu}(W_e^i * s_t^i)$.

13. The fusion cell of claim 11, wherein the fusion gate result $p_t^k = \sigma(\Sigma_{i=1}^M W_p^i * e_t^i)$, $\forall k \in [1, m-1]$.

14. The fusion cell of claim 11, wherein the fusion gate employs an element-wise sum function and a sigmoid function to generate the fusion gate result $p_t^k$ based on the first adjusted sensor encoding $e_t^i$ and the second adjusted sensor encoding $e_t^j$.

15. The fusion cell of claim 11, wherein the first product is input to a first gate of a first architecture within the LSTM cell employing an element-wise sum function summing the first product and a hidden state $h_{t-1}$.

16. The fusion cell of claim 11, wherein the second product is input to a first gate of a second architecture within the LSTM cell employing an element-wise sum function summing the second product and a hidden state $h_{t-1}$.

17. A method for sensor fusion associated with a long short-term memory (LSTM) cell, comprising:
 generating a first adjusted sensor encoding $e_t^i$ based on a first sensor encoding $s_t^i$ from a first sensor;
 generating a second adjusted sensor encoding $e_t^j$ based on a second sensor encoding $s_t^j$ from a second sensor;
 generating a fusion result $p_t^k$ based on the first adjusted sensor encoding $e_t^i$ and the second adjusted sensor encoding $e_t^j$;
 generating a first product based on the fusion result $p_t^k$ and the first adjusted sensor encoding $e_t^i$;
 generating a second product based on $(1 - p_t^k)$ and the second adjusted sensor encoding $e_t^j$; and
 generating a fused state $a_t$ based on the first product and the second product,
 wherein the fused state $a_t$ is input into a first pate.

18. The method for sensor fusion of claim 17, wherein the first adjusted sensor encoding $e_t^i = \text{relu}(W_e^i * s_t^i)$.

19. The method for sensor fusion of claim 17, wherein the fusion result $p_t^k = \sigma(\Sigma_{i=1}^M W_p^i * e_t^i)$, $\forall k \in [1, m-1]$.

20. The method for sensor fusion of claim 17, wherein the fused state $a_t = (\Sigma_{k=1}^{M-1} p_t^k \odot e_t^k) + (1 - \Sigma_{k=1}^{M-1} p_t^k) \odot e_t^k$.

* * * * *